United States Patent

Aoki et al.

[11] Patent Number: 5,910,993
[45] Date of Patent: Jun. 8, 1999

[54] APPARATUS AND METHOD FOR ACTIVELY REDUCING VIBRATION AND/OR NOISE

[75] Inventors: Kazushige Aoki; Tutomu Hamabe; Shigeki Satoh, all of Kanagawa; Yousuke Akatu, Yokohama, all of Japan

[73] Assignee: Nissan Motor Co., Ltd., Yokohama, Japan

[21] Appl. No.: 08/858,041

[22] Filed: May 16, 1997

[30] Foreign Application Priority Data

May 16, 1996 [JP] Japan ................................. 8-121910

[51] Int. Cl.⁶ ........................................... G10K 11/16
[52] U.S. Cl. ................................. 381/71.12; 364/724.19
[58] Field of Search ............................ 381/71.8, 71.11, 381/71.12, 71.14; 364/724.19

[56] References Cited

U.S. PATENT DOCUMENTS

| | | |
|---|---|---|
| 5,305,307 | 4/1994 | Chu . |
| 5,325,437 | 6/1994 | Doi et al. . |
| 5,337,365 | 8/1994 | Hamabe et al. . |
| 5,384,853 | 1/1995 | Kinoshita et al. . |
| 5,416,844 | 5/1995 | Nakaju et al. . |
| 5,426,703 | 6/1995 | Hamabe et al. . |
| 5,434,783 | 7/1995 | Pal et al. ........................... 364/424.05 |
| 5,455,779 | 10/1995 | Sato et al. . |
| 5,647,579 | 7/1997 | Satoh . |
| 5,675,286 | 10/1997 | Baker et al. . |

FOREIGN PATENT DOCUMENTS

| | | |
|---|---|---|
| 0 684 594 | 11/1995 | European Pat. Off. . |
| 43 05 217 | 2/1992 | Germany . |
| 07239690 | 9/1995 | Japan . |

OTHER PUBLICATIONS

S. Elliott, et al, "A Multiple Error LMS Algorithm and Its Application to the Active Control of Sound and Vibration," IEEE Transactions on Acoustics, Speech, and Signal Processing, vol. ASSP–35, No. 10, Oct. 1987; pp. 1423–1434.

*Primary Examiner*—Forester W. Isen
*Attorney, Agent, or Firm*—Foley & Lardner

[57] ABSTRACT

In apparatus and method for actively reducing a periodic vibration and/or noise, a divergence determinator is provided in which a presence or absence of a higher order divergence of a control of the reduction of the periodic vibration and/or noise is determined on the basis of a sum of two sampled values of at least one of either a drive signal y or a residual wave (vibration or noise) signal e, phases of the two sampled values being mutually deviated from each other by an approximately half period of a fundamental order of the corresponding drive or residual wave signal.

30 Claims, 10 Drawing Sheets

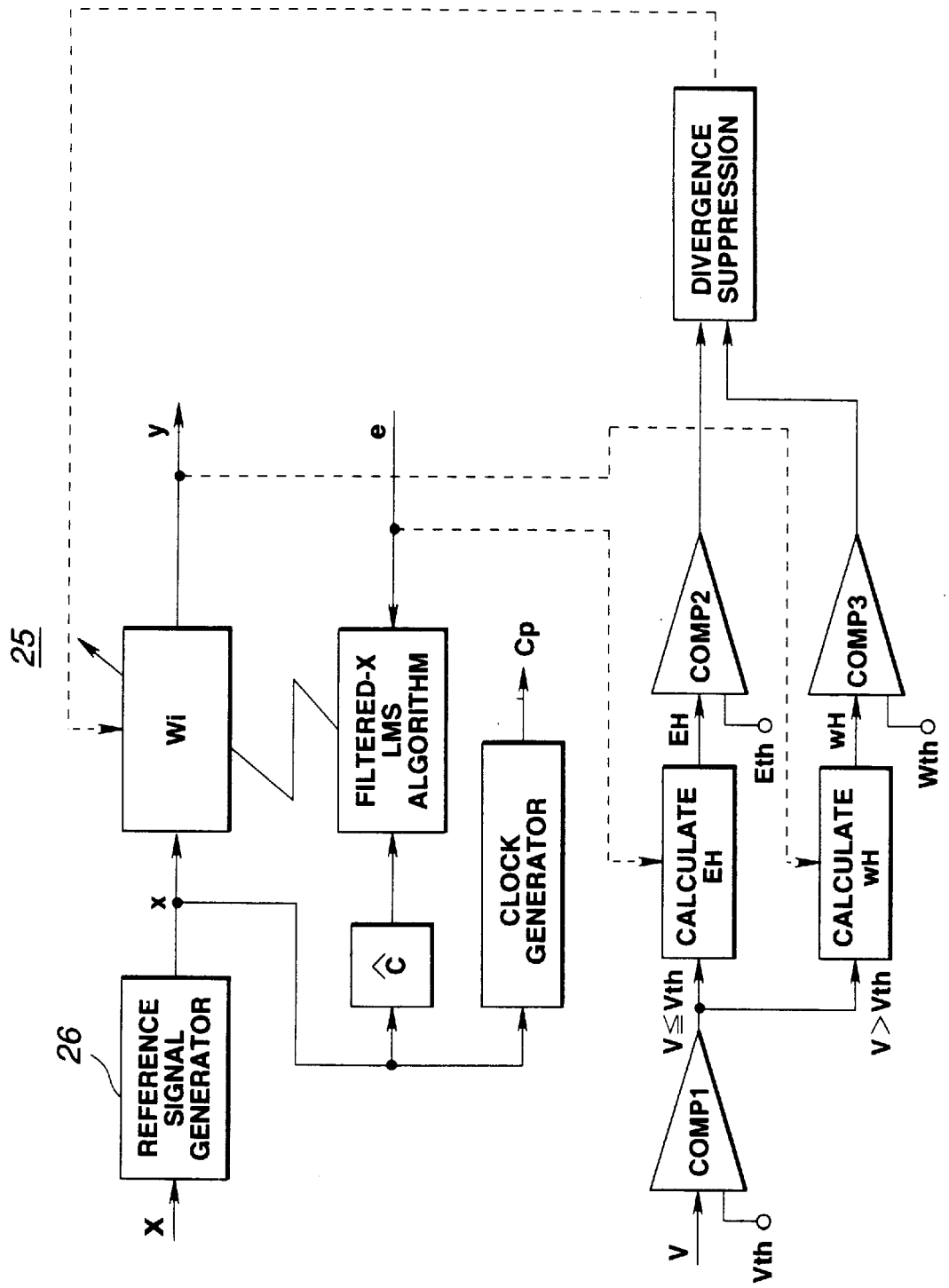

APPARATUS AND METHOD FOR ACTIVELY REDUCING VIBRATION AND/OR NOISE

BACKGROUND OF THE INVENTION

The present invention relates to apparatus and method for actively reducing vibration and/or noise in which a reduction control against a periodic noise or periodic vibration is executed using an adaptive digital filter whose weight coefficients (filter coefficients) are updated in accordance with an adaptive algorithm. The present invention specifically relates to the actively vibration and/or noise reducing apparatus and method in which a divergence of the reduction control for higher order harmonics of the periodic vibration or noise can easily be determined without failure.

A Japanese Patent Application First Publication Heisei (JP-A1-) 7-239690 published on Sep. 12, 1995 exemplifies a previously proposed actively vibration and/or noise reducing apparatus.

In the previously proposed actively vibration and/or noise reducing apparatus disclosed in the above-identified Japanese Patent Application Publication, a control sound or a control vibration is interfered against the periodic noise transmitted from a noise source such as a vehicular engine into a passenger compartment or the periodic vibration propagated onto a vehicle body from a periodic vibration source such as the vehicular engine so as to reduce the noise and/or the vibration. In addition, in a controller of the previously proposed vibration and/or noise reducing apparatus, a reference signal representing a developed condition of the periodic noise or the periodic vibration is filtered through an adaptive digital filter so as to generate and output a drive signal to drive a control sound source or a control vibration source and filter coefficients of the adaptive digital filter are sequentially updated in accordance with an adaptive algorithm.

Since a synchronous-type Filtered-X LMS (Least Mean Square) algorithm is used as the adaptive algorithm described above, a higher order divergence which occurs when the above-described Filtered-X LMS algorithm is applied as the adaptive algorithm is determined and an appropriate countermeasure against the occurrence of the higher order divergence is taken.

Specifically, a local maximum value e1MAX and a local minimum value e1MIN of the residual vibration signal, the residual noise signal or drive signal within one period of the reference signal x is searched and a controller determines whether the divergence of the control occurs on the basis of an appearance interval Δt1 between the local maximum value e1MAX and the local minimum value e1MIN and a difference Δ E1 between these maximum and minimum values. In other words, under such a situation that the control to reduce the periodic noise or periodic vibration is normally executed without divergence, the period of the residual noise signal, residual vibration signal, or the drive signal should coincide with the period of the reference signal. On the other hand, under such a situation that the control tends to progressively be diverged in higher orders, higher order signal components than the reference signal appear on the residual noise signal, residual vibration signal, or drive signal. The higher signal components becomes larger as the tendency of the higher order divergence becomes stronger. Hence, a presence or absence of the higher order divergence of the control and a magnitude of the divergence can be determined depending upon the appearance interval and difference between the local maximum value and local minimum value of the residual noise signal, of the residual vibration signal, or of the drive signal.

Since, in the previously proposed actively vibration and/or noise reducing apparatus disclosed in the above-identified Japanese Patent Application Publication, the high order divergence of the control can be determined without a frequency analysis of each signal by means of a FFT (Fast Fourier Transform), a remarkable increase in an arithmetic operation load on an arithmetic operation and processing unit is not resulted.

The previously proposed apparatus for actively reducing vibration and/or noise can determine the presence or absence of the divergence of the control and magnitude of the divergence and can reduce the arithmetic operation load as compared with the analysis using the FFT. However, it is necessary to execute various types of arithmetic operation processes such as a search (retrieving) processing of each of the local maximum value and local minimum value, the arithmetic processing of the appearance interval and difference between the local maximum and local minimum values, and the determination processing of the divergence. Hence, an expensive microprocessor having a high arithmetic processing capability needs to be used in order to actually perform the vibration and/or noise reducing control in parallel to performing the divergence determination processing.

In other words, an industry has demanded a further simplification of arithmetic processing required to determine the higher order divergence of the control.

SUMMARY OF THE INVENTION

It is, therefore, an object of the present invention to provide apparatus and method for actively reducing vibration and/or noise which can easily and simply determine a high order divergence of a reduction control of a periodic wave such and a periodic vibration and/or periodic noise without failure.

The above-described object can be achieved by providing an apparatus comprising:

a) a periodic wave generating source;

b) a control wave generating source so arranged and constructed as to be enabled to generate and output a control wave to be interfered against a periodic wave developed on the periodic wave generating source;

c) a reference signal generator so arranged and constructed as to generate and output a reference signal representing a developed condition of the periodic wave from the periodic wave generating source;

d) a residual wave detector so arranged and constructed as to detect a residual wave after the interference of the control wave outputted by the control wave generating source against the periodic wave developed on the periodic wave generating source and output a residual wave signal representing the residual wave; and e) a controller having; an adaptive digital filter so arranged and constructed as to filter the reference signal therethrough to generate and output a drive signal to drive the control wave generating source to generate and output the control wave; an adaptive algorithm in accordance with which filter coefficients of the adaptive digital filter are updated on the basis of either the reference signal or the residual wave signal so as to control a reduction of the periodic wave; a sampler so arranged and constructed as to sample at least one of either or both of the drive signal and the residual wave signal for a predetermined sampling period; a summer so arranged and constructed as to sum two sampled values of at least one of either or both of the drive signal outputted by the adaptive digital filter and the residual wave signal outputted by the residual wave detector; and a divergence determinator so arranged and constructed as to determine whether a higher order divergence of a control over a transmission of the periodic wave from the periodic wave generating source toward an external therefrom occurs on the basis of the sum of the two sampled values of either or both of the drive signal or the residual wave signal, phases of the two sampled values being mutually deviated from each other by an approximately half period of a fundamental order of the corresponding drive signal or residual wave signal.

The above-described object can also be achieved by providing a method for actively reducing a periodic vibration and/or noise developed on a periodic vibration and/or a periodic noise generating source and transmitted from the periodic vibration and/or periodic noise generating source to an external therefrom, comprising the steps of:

a) providing an adaptive digital filter;

b) providing an adaptive algorithm;

c) updating sequentially filter coefficients of the adaptive digital filter so as to execute a reduction control for the periodic vibration or noise;

d) developing a residual wave signal representing a residual vibration or noise state of the external;

e) sampling two values at a predetermined sampling period which would cancel a fundamental order component of either an output signal of the adaptive digital filter or the residual wave signal if the two values were added together;

f) summing the two sampled values; and g) determining whether a divergence of the reduction control occurs on the basis of the summed sampled values.

The above-described object can also be achieved by providing a method for actively reducing a periodic reducing a periodic wave developed on a periodic wave generating source and transmitted from the periodic wave generating source to an external therefrom, comprising the steps of:

a) developing a control wave to be interfered against a periodic wave developed on the periodic wave generating source;

b) developing a reference signal representing a developed condition of the periodic wave from the periodic wave generating source;

c) detecting a residual wave after the interference of the control wave developed at the step a) against the periodic wave developed on the periodic wave generating source;

d) outputting a residual wave signal representing the residual wave;

e) filtering the reference signal developed at the step b) through an adaptive digital filter to generate and output a drive signal so that the control wave is developed at the step a);

f) providing an adaptive algorithm in accordance with which filter coefficients of the adaptive digital filter are updated on the basis of the reference signal and the residual signal for a predetermined sampling period;

g) sampling at least one of either or both of the drive signal and the residual signal for a predetermined sampling period;

h) summing two sampled values of at least one of either or both of the drive signal outputted by the adaptive digital filter and the residual wave signal outputted at the step d); and i) determining whether a higher divergence of a control over a transmission of the periodic wave from the periodic wave generating source toward an external therefrom occurs on the basis of the sum of the two sampled values of either or both of the drive signal and the residual wave signal, phases of the two sampled values being mutually deviated from each other by an approximately half period of a fundamental order component of the corresponding drive signal or residual wave signal.

BRIEF DESCRIPTION OF THE DRAWINGS

FIG. 1C is a functional signal processing circuit block diagram of the controller shown in FIGS. 1A and 1B.

BEST MODE FOR CARRYING OUT THE INVENTION

Reference will hereinafter be made to the drawings in order to facilitate a better understanding of the present invention.

(First Embodiment)

FIGS. 1A through 6 show a first preferred embodiment of an apparatus for actively reducing vibration and/or noise according to the present invention.

Figure 1A:
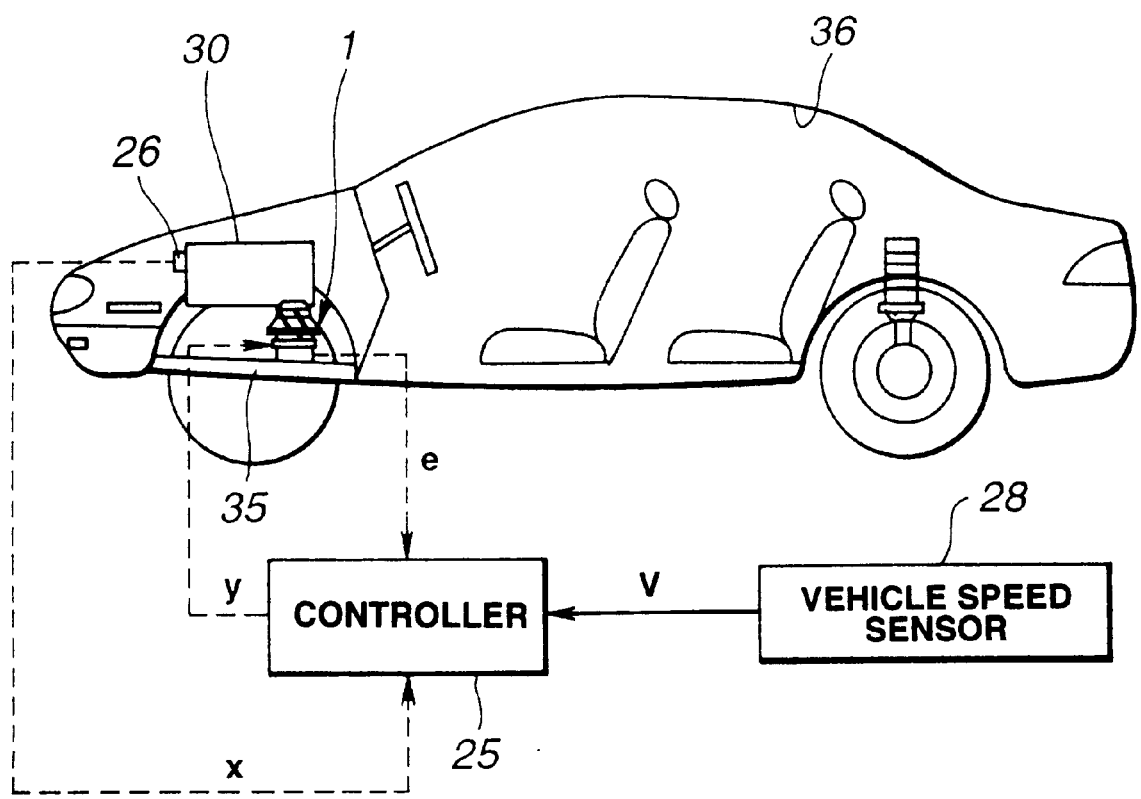
FIG. 1A is an overall schematic view of an automotive vehicle to which a first preferred embodiment of an apparatus for actively reducing vibration and/or noise according to the present invention is applicable.

FIG. 1A is a rough side view of an automotive vehicle to which the vibration and/or noise actively reducing apparatus in the first embodiment according to the present invention is applicable. A vehicular engine 30 is supported on a vehicle body 35 constituted by, e.g., a suspension member via an active type engine mount 1. The active type engine mount 1 is capable of developing an active supporting force with respect to the engine 30 in response to a drive signal. The drive signal will be described later. Actually, a plurality of passive type engine mounts are interposed between the engine 30 and vehicle body 35 in addition to the active type engine mount 1. The passive type engine mounts develop passive supporting forces in response to relative displacements between the engine 30 and vehicle body 35. The passive type engine mounts include, for example, normal-type engine mounts made of resilient materials such as rubbers and supporting a weight of the engine and fluid sealing-type mount insulators in each of which a fluid is sealed in an interior of a rubber formed resilient material so as to be enabled to develop a damping force against the weight of the engine 30.

Figure 1B:
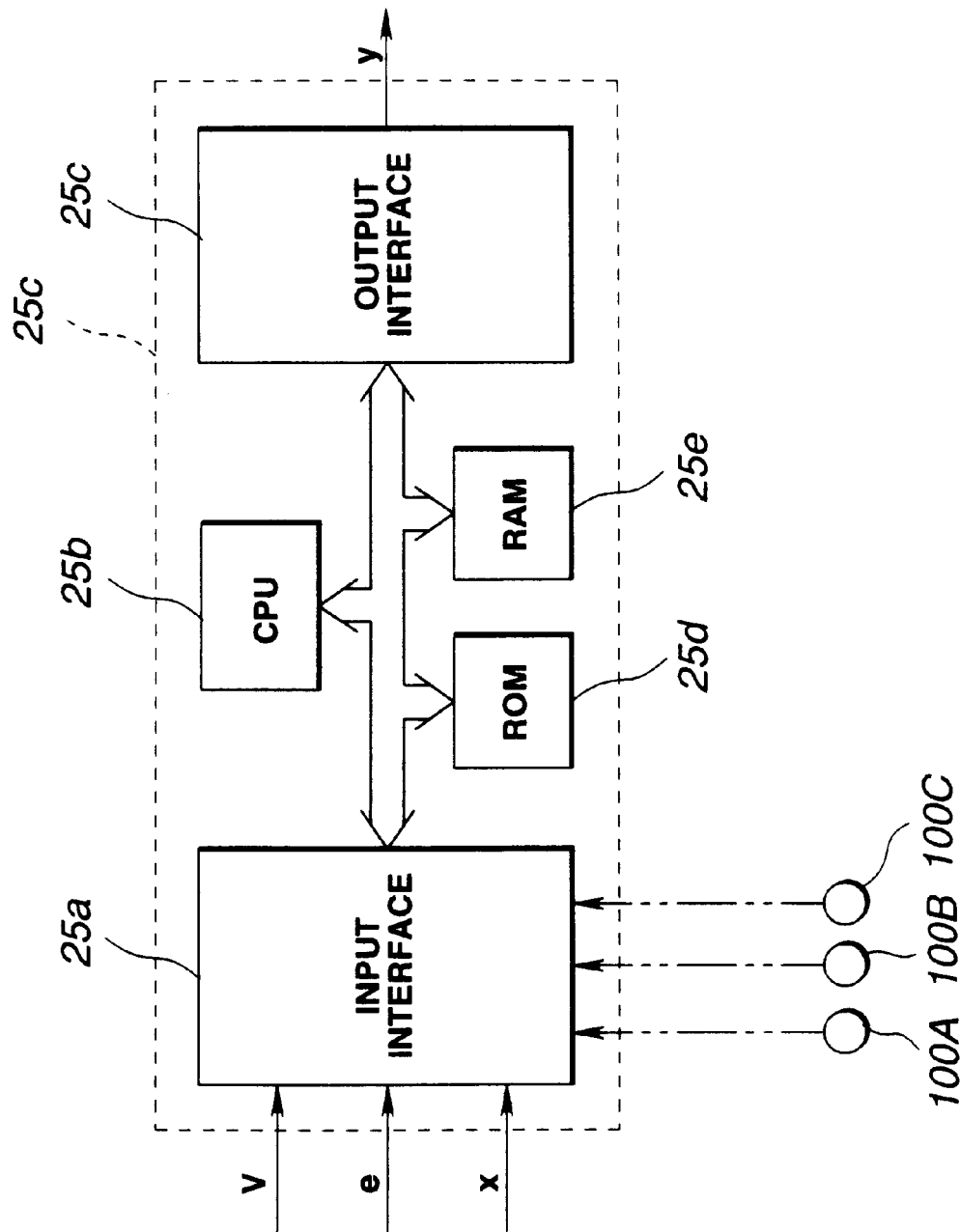
FIG. 1B is a circuit block diagram of a controller shown in FIG. 1A.
Figure 2:
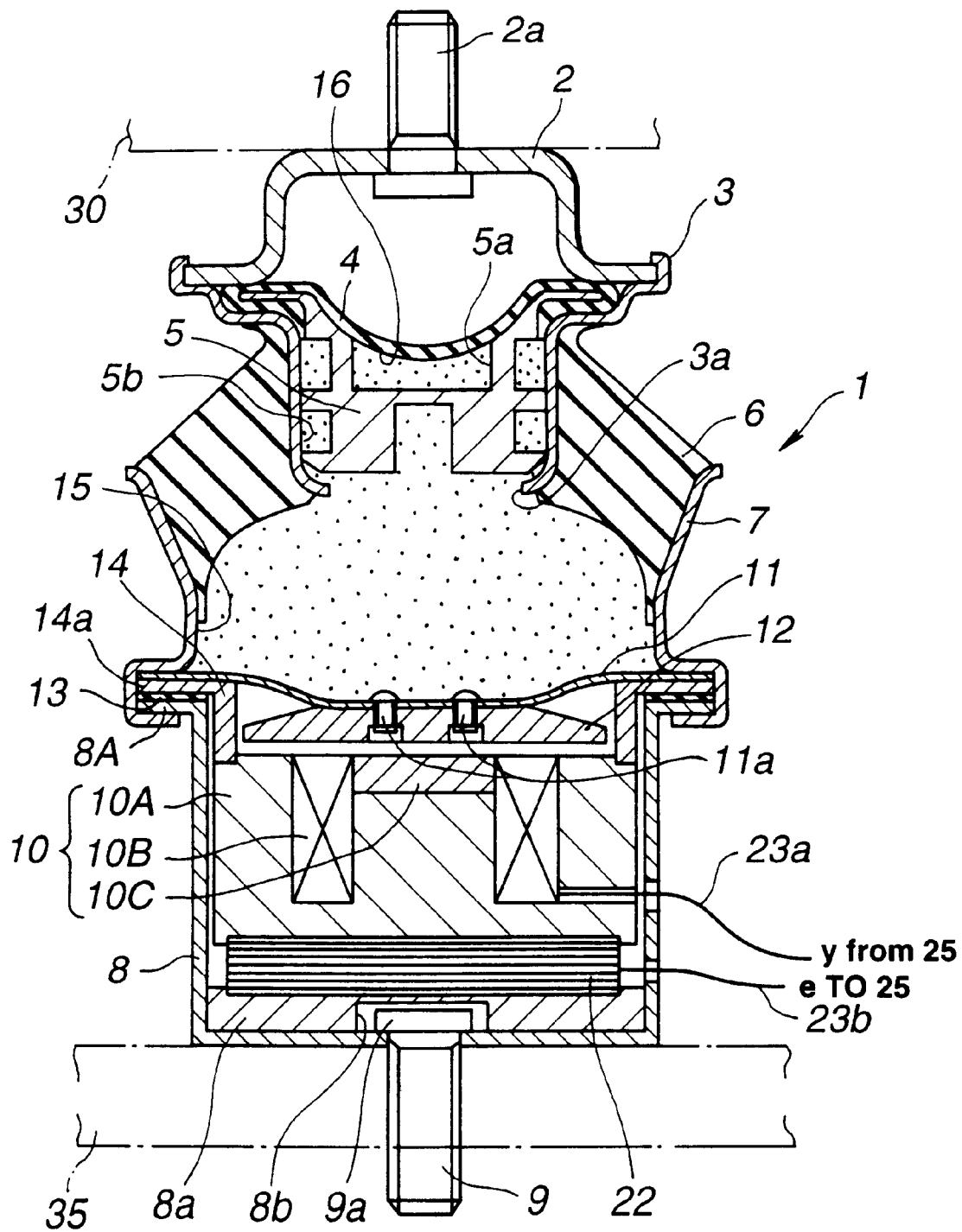
FIG. 2 is a cross sectional view of an example of an active type engine mount shown in FIG. 1A.

FIG. 2 shows an example of the active type engine mount 1 used in the first embodiment of the vibration and/or noise actively reducing apparatus shown in FIGS. 1A to 1C.

The active type engine mount 1 includes: a bolt 2a integrally mounted on an upper portion of the engine mount 1 so that the engine 30 is attached onto the bolt 2a; a bell-shaped cap 2 whose upper flat end integrally receives the bolt 2a, having a hollow cavity in an interior thereof, and having an opening at a lower end portion; and an inner envelope 3 whose upper end portion is staked to the cap 2 and having an axis extended vertically along the engine mount 1.

The inner envelope 3 is formed in an inverted bell shape having a reduced diameter at a lower end portion thereof. A circular opening 3a is formed around the lower end portion of the inner envelope 3 bent approximately inwardly and horizontally.

A diaphragm 4 is disposed within the inner side of the inner envelope 3 so as to divide an inner space defined by both of the cap 2 and inner envelope 3 into two and so as to be inserted toward staked portions of the cap 2 and of the inner envelope 3. The upper inner space of the diaphragm 4 is exposed to the atmospheric pressure with at least one hole penetrated through a side surface of the cap 2.

Furthermore, a member constituting an orifice 5 is disposed in an inner side of the inner envelope 3. A thin-film like resilient material is interposed between the inner surface of the inner envelope 3 and the member constituting the orifice 5 is tightly fitted into the inner side of the inner envelope 3.

The member constituting the orifice 5 is matched to the inner space of the inner envelope 3 and is formed in an approximately cylindrical shape. A circular recess 5a is formed on the upper surface of the member 5. An orifice 5b serves to communicate a fluid flow between the recess 5a and the part opposing the opening 3a provided at a bottom surface of the inner envelope 3. The orifice 5b includes, for example, a groove extending spirally along an outer peripheral surface of the member constituting the orifice 5, a fluid passage communicating one end portion of the groove to the recessed portion 5a, and a fluid passage communicating the other end of the groove to the opening 3a.

On the other hand, an inner peripheral surface of a supporting resilient member 6 has a wall thickness, formed in the cylindrical surface being raised slightly upward. The inner peripheral surface of the supporting resilient member 6 is vulcanized and adhered to the outer peripheral surface of the inner envelope 3. An outer peripheral surface of the supporting resilient member 6 is vulcanized and adhered into an upper side of the inner peripheral surface of an outer envelope 7 as a cylindrical member having an elongated diameter at an upper end. A lower end portion of the outer envelope 7 is staked to an upper end portion of a cylindrical actuator casing 8. In addition, a bolt 9 used to mount the actuator casing 8 on a frame 35 is projected from an upper end surface of the actuator casing 8. A head 9a of the bolt 9 is disposed and fixed to an inner bottom surface of the actuator casing 8 and is housed within a cavity portion located at a center of a flat plate member 8a.

Furthermore, an electromagnetic actuator 10 includes: a cylindrical yoke 10A made of an iron; and exciting coil 10B wound around the center portion of the yoke 10A with its axis of the coil extended vertically; a permanent magnet 10C located at an upper surface of the yoke 10A which is enclosed by the exciting coil 10B having poles fixed so as to face vertically against a magnetic path forming member 12 and the cylindrical yoke 10A.

In addition, a flange portion 8a is formed on the upper end portion of the actuator casing 8. A lower end of the outer envelope 7 is integrally staked to the flange portion 8a. A peripheral edge portion of a circular metallic plate spring 11 is inserted into the stake portion of the flange portion 8a. A magnetizable magnetic path forming member 12 is fixed to the electromagnetic actuator 10 located at the center portion of the plate spring 11. It is noted that the magnetic path forming member 12 is a circular plate made of iron and having a diameter slightly smaller than the yoke 10A. The bottom surface of the magnetic path forming member 12 is formed of a thickness so as to adjoin to the electromagnetic actuator 10.

Furthermore, in the staked portion of the flange portion 8A, a ring-shaped thin-film resilient member 13 and a flange portion 14a of a force transmission member 14 are inserted so as to be enclosed by the flange portion 8A and the plate spring 11. Specifically, the thin-film resilient member 13, the flange portion 14a of the force transmission member 14, and the plate spring 11 are overlapped in this sequence and the whole overlapped portion is staked to the lower end portion of the outer envelope 7.

The force transmission member 14 is a relatively short cylindrical member enclosing the magnetic path forming member 12. The upper end serves as the flange portion 14a. The lower end portion of the force transmission member 14 is coupled to the upper surface of the electromagnetic actuator 10. Specifically, the lower end portion of the force transmission member 14 is fitted into a circular groove formed on a peripheral edge of an upper end surface of the yoke 10A to be coupled together. If is noted that a spring constant of the force transmission member 14 having an elastic deformation is set to be larger than the spring constant of the thin-film resilient member 13.

In the first embodiment, a fluid chamber 15 is formed on a part defined by a lower surface of the supporting resilient member 6 and by an upper surface of the plate spring 11. A secondary fluid chamber 16 is formed on a part defined by a diaphragm 4 and the recess 5a. The fluid chamber 15 is communicated with the secondary fluid chamber 16 via the orifice 5b formed on the member constituting the orifice 5. The fluid such as oil is sealed in the secondary fluid chamber 16 and orifice 5b.

The characteristic as a fluid-type mount determined according to a fluid passage formation of the orifice 5b is adjusted to indicate a high dynamic spring constant and a high damping force when an engine shake occurs during the running of the vehicle, i.e., when the vibration (a vibration exciting force) having a frequency band of 5 to 15 Hz is applied to the active type engine mount 1.

A predetermined magnetomotive force is developed from the electromagnetic actuator 10 in response to the drive signal y supplied from the controller 25 via a wire harness 23a.

The controller 25 includes, as shown in FIG. 1B, a microcomputer having an input interface 25a including an analog-to-digital converter and an amplifier, an output interface 25c including a digital-to-analog converter and an amplifier, a CPU (Central Processing Unit) 25b, RAM (Random Access Memory) 25c, ROM (Read Only Memory) 25d, and common bus.

When an idling vibration, an enclosed vibration propagated vibration in a passenger compartment), or engine vibration during an engine acceleration, each of which is a vibration whose frequency is higher than that in the case of the engine shake (5 to 15 Hz) is inputted to the vehicle body 35, the controller 25 generates and outputs the drive signal y to the active type engine mount 1 so that the active supporting force such as to cancel such kinds of propagated vibrations as described above.

The idling vibration or enclosed vibration is mainly caused by the engine vibration of a second-order harmonic component of an engine revolution to be transmitted to the vehicle body 35, for example, in a case of a reciprocating-type, four-stroke (Otto-cycle), four-cylinder engine.

Thus, the reduction of the vibration appearing on the vehicle body 35 is possible if the drive signal in synchronization with the second-order harmonic component of the engine vibration is generated and outputted (it is noted that a phase of the drive signal is 180° opposite to that of the second-order harmonic component of the engine vibration).

In the first embodiment, an impulse signal x is generated by means of a pulse signal generator 26 which is synchronized with the revolution X in a crankshaft of the engine 30 (one (impulse) whenever the crankshaft has rotated through 180 degrees, for example, in the case of the four-cylinder engine). The controller 25 receives the impulse signal x from the pulse signal generator 26 as a reference signal x which represents a generation condition of the vibration occurring in the engine 30.

A weight sensor 22, as shown in FIG. 2, detects the vibration force (the vibration exciting force) transmitted from the engine 30 via the supporting resilient member 6. The weight sensor 22 is inserted between the lower end of the yoke 10A of the electromagnetic actuator 10 and an upper surface of the flat plate member 8a forming the bottom surface of the actuator casing 8. A detection result of the weight sensor 22 is supplied to the controller 25 as a residual vibration signal e. The weight sensor 22 may be constituted by a transducer device such as a piezoelectric device, magnetostrictive device, or a strain gauge.

The controller 25 executes a synchronous-type Filtered-X LMS (Least Mean Square) algorithm which is an adaptive algorithm on the basis of the residual vibration signal e and reference signal x. The controller 25 then calculates the drive signal y and outputs the drive signal y to the active type engine mount 1. The synchronous-type Filtered-X LMS algorithm is exemplified by an IEEE transaction on Acoustics, Speech, and Signal processing volume ASSP-35, No 10, October, 1987, titled "A Multiple Error LMS Algorithm and Its Application to the Active Control of Sound and Vibration" by Stephen J. Elliott, et al.

Specifically, the controller 25, as shown in FIG. 1C, includes an adaptive digital filter W whose filter coefficients Wi (i=0, 1, 2, - - - , I-1, and I denotes a number of taps of the adaptive digital filter W) are variable. The adaptive digital filter W sequentially outputs the filter coefficients Wi as the drive signal y at each interval of a predetermined sampling clock Cp from a time point at which the latest reference signal x is inputted from the pulse signal generator 26 to the controller 25. In addition, the filter coefficients Wi of the adaptive digital filter W are properly and sequentially updated on the basis of the reference signal x and residual signal e.

An equation used to update the filter coefficients Wi in the adaptive digital filter W is given in accordance with the Filtered-X LMS algorithm as follows:

$$Wi(n+1) = Wi(n) - \mu \cdot R^T e(n). \quad (1)$$

The terms to which (n) and (n+1) are attached represent values at the sampling time n and n+1 and $\mu$ denotes a convergence coefficient. In addition, $R^T$ denotes a reference signal used for updating the filter coefficients Wi and is a value derived by filtering the reference signal x through a transfer function filter $C^\wedge$. It is noted that the transfer function filter $C^\wedge$ is a filter of a transfer function C established between the electromagnetic actuator 10 and the weight sensor 22 of the active type engine mount 1. Since a magnitude of the reference signal x corresponds to a logical value of "1", impulse responses of the transfer function filter $C^\wedge$ are sequentially generated in synchronization with the reference signal x and the reference signal $R^T$ is coincident with a sum of the impulse references at a sampling time n.

Theoretically, the drive signal y is generated by filtering the reference signal x through the adaptive digital filter W.

Since the magnitude of the reference signal x corresponds to "1", the sequential output of the filter coefficients Wi as the drive signal y means the same result as the filtering process as resulted in the drive signal y.

Furthermore, in the first embodiment, a vehicle speed sensor 28 is disposed in the vehicle so as to detect a vehicle speed, a vehicle speed signal indicating the vehicle speed V is outputted to the controller 25.

The controller 25 executes the output processing of the drive signal y, updates the respective filter coefficients Wi of the adaptive digital filter W, and executes a divergence determination processing to determine the higher-order divergence tendency of a reduction control of the periodic vibration and/or noise on the basis of the value of the present filter coefficient Wi of the adaptive digital filter W or the sampled value of the residual vibration signal e.

In details, whenever the updating process of each filter coefficient Wi of the adaptive digital filter W is circularly ended (over one period), the divergence determination processing is executed.

At the divergence determination processing, the controller 25 determines whether the vehicle is completely or approximately stopped (with the engine 30 driven) on the basis of the vehicle speed indicative signal supplied from the vehicle speed sensor 28. When the vehicle is completely or approximately stopped, a calculation processing to determine the divergence on the basis of the residual vibration signal e is executed. When the vehicle is running, a calculation processing to determine the divergence on the basis of the filter coefficients Wi of the adaptive digital filter W (the drive signal y) is, in turn, executed.

If the higher-order divergence of the control is not determined to occur as the result of either the calculation processing to determine the divergence, the divergence determination processing is directly ended and is returned to a main processing routine. If the higher-order divergence of the control is determined to occur, a predetermined divergence suppression processing to suppress the higher-order divergence of control is, then, executed.

Next, an operation of the first preferred embodiment of the actively vibration and/or noise reducing apparatus according to the present invention will be described below.

That is to say, when the engine shake occurs, the formation of the fluid passage in the orifice 5a is properly selected. Consequently, since the active type engine mount 1 functions as the supporting apparatus having the high dynamic spring constant and the high damping force characteristic. Hence, the engine shake occurs on the engine 30 and is attenuated by means of the active type engine mount 1 so that the vibration level on the vehicle body 35 is reduced. It is, especially, not necessary to displace positively the movable plate 12 for the engine shake.

On the other hand, in a case where the vibration having the frequency equal to or higher than that of the vibration during the engine idling that the fluid within the orifice 5a is stuck so that the fluid communication between the fluid chamber 15 and secondary fluid chamber 16 becomes impossible is received by the active type engine mount, the controller 25 executes a predetermined calculation processing and outputs the drive signal y to the electromagnetic actuator 10, generating the active supporting force which can reduce the vibration to the active type engine mount 1.

Figure 3:
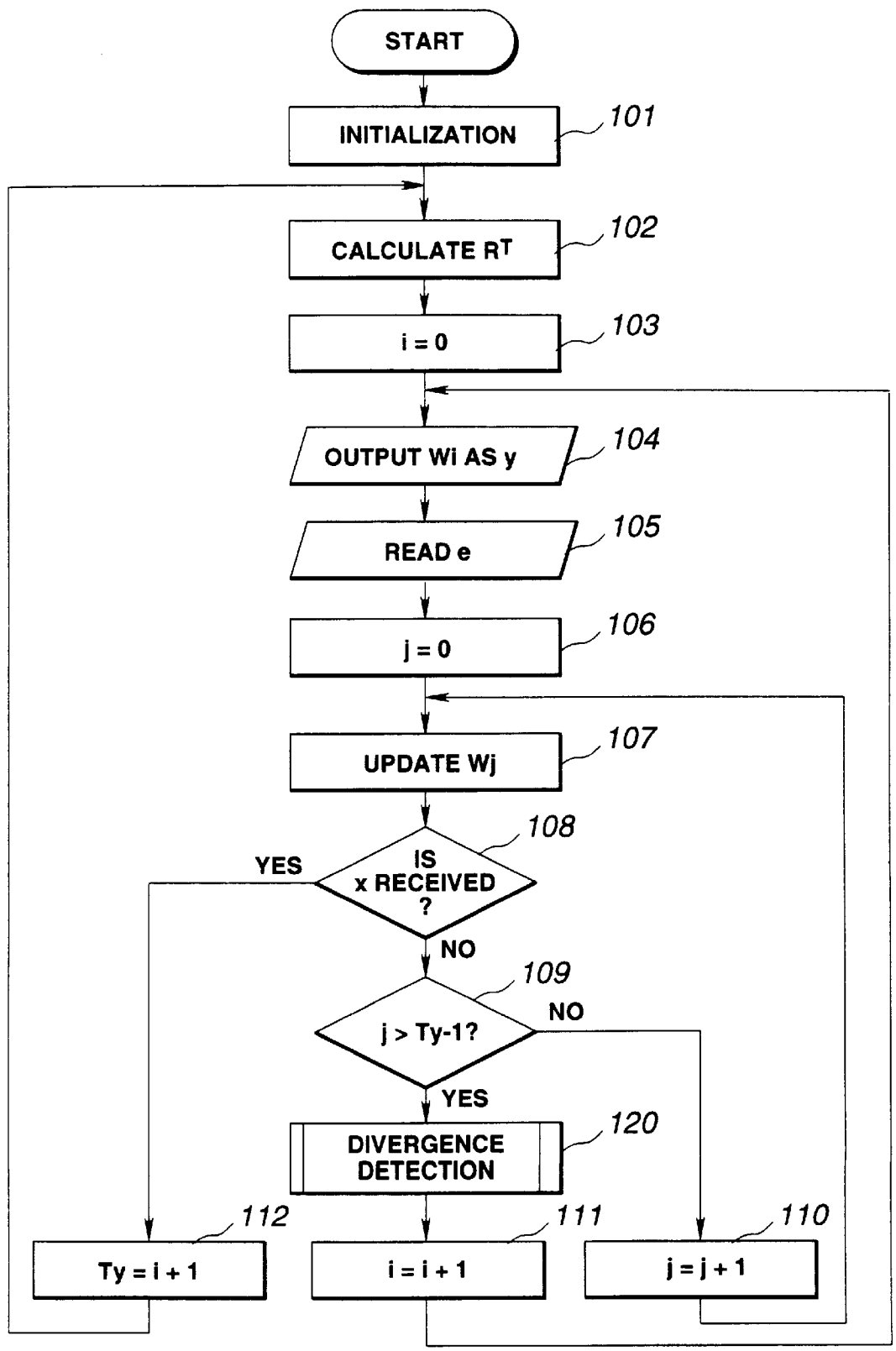
FIG. 3 is a processing flowchart executed in the controller for explaining a vibration reducing processing routine in the first embodiment shown in FIGS. 1A to 2.

FIG. 3 shows an operational flowchart representing a main processing routine executed within the controller 25 when the vibrations of the engine idling and/or the enclosed vibration are inputted to the controller 25 via the reference signal x and the active type engine mount 1.

At a first step 101, the CPU 25b carried out a predetermined initialization. Thereafter, the routine goes to a step 102 in which the CPU 25b calculates to derive the reference signal RT used to update the filter coefficient Wi on the basis of the transfer function filter C^. At the step 102, the CPU 25b totally calculates the reference signal $R^T$ used to update the filter coefficients Wi for one period of the drive signal y. Then, the routine goes to a step 103 in which a counter j is cleared to zero and the routine goes to a step 104. At the step 104, the CPU 25b outputs the i-th number filter coefficient Wi of the adaptive digital filter W as the drive signal y. After the drive signal y is outputted from the controller 25 at the step 104, the routine goes to a step 105 in which the residual vibration signal e is read. The residual vibration signal e is stored in the RAM 25e together with the present value of the counter i.

Then, the routine goes to a step 106 in which the counter j is cleared to zero. At the next step 107, the CPU 25b updates the j-th number filter coefficient Wj of the adaptive digital filter W in accordance with the equation (1).

Upon completion of the updating processing at the step 107, the routine goes to a step 108 in which the CPU 25b determines whether the subsequent reference signal x is inputted.

If the CPU 25b determines that the reference signal x is not inputted at the step 108, the routine goes to a step 109 in which the updating of the subsequent filter coefficient of the adaptive digital filter W is executed or the output processing of the drive signal y is executed.

That is to say, at the step 109, the CPU 25b determines whether the count value of the counter j has reached to a number of times the output of the drive signal y is carried out (hereinafter called, the number of output times Ty, in a correct sense of the term, a value of the number of output times Ty from which one is subtracted since the counter j starts the count from zero). This determination is based on the determination of whether the filter coefficient Wi has been updated by a required number as the drive signal y after the output of the filter coefficient Wi of the adaptive digital filter W is outputted as the drive signal y at the step 104. If the answer of the step 109 is "NO" at the step 109, the routine goes to a step 110 in which the counter j is incremented. Then, the routine returns to the step 107 and the above-described series of processing is repeated.

On the other hand, if the answer at the step 109 is "YES", the routine goes to a step 120 since the CPU 25b can determine that the updating processing of the filter coefficient by the required number as the drive signal y has been completed from among the filter coefficients of the adaptive digital filter W.

At the step 120, the divergence determination processing to detect the higher-order divergence of the control is executed.

The detailed content of processing at the step 120 will be described later.

Next, the routine goes from the step 120 to a step 111 in which the counter i is incremented. Then, the routine goes to the step 104 in which the required processing is ended and the CPU 25b waits for the passage of a time corresponding to the interval of the predetermined sampling clock Cp. If the time corresponding to the interval of the predetermined sampling clock is passed, the routine returns to the step 104 and the same processing is repeated.

On the other hand, if the CPU 25b determines that the reference signal x is inputted at the step 108, the routine goes to a step 112 in which the counter i (in the correct sense of the term, the value of the count value of the counter i to which one is added since the counter i starts the count from zero) is stored as the latest number of the output times Ty and, thereafter, the routine returns to the step 102. Then, the above-described processing is repeated.

As the result of the series of processing shown in FIG. 3, the controller 25 supplies the respective filter coefficients Wi sequentially as each of the drive signals y at the interval of the sampling clock Cp from a time point at which the reference signal x is received to the electromagnetic actuator 10 of the active-type engine mount 1.

Consequently, the magnetomotive force according to the drive signal y is developed on the exciting coil 10B. Since a constant magnetomotive force is always given onto the magnetic path forming member 12 by means of the permanent magnet 10C, the magnetomotive force developed by the exciting coil 10B may act to strengthen or weaken the magnetomotive force by means of the permanent magnet 10C. In details, when no drive signal y is supplied to the exciting coil 10B, the magnetic path forming member 12 is displaced at a neutral position at which the supporting force by means of the plate spring 11 and the magnetomotive force by means of the permanent magnet 10C are balanced. With the magnetic path forming member 12 placed at the neutral position, the drive signal y described above is supplied to the exciting coil 10B. At this time, if the magnetomotive force developed on the exciting coil 10B is opposite to that by means of the permanent magnet 10C, the magnetic path forming member 12 is displaced toward the direction at which the clearance with respect to the electromagnetic actuator 10 is increased. On the contrary, if the magnetomotive force developed on the exciting coil 10B is the same direction as that by means of the permanent magnet 10C, the magnetic path forming member 12 is displaced toward a direction at which the clearance with respect to the electromagnetic actuator 10 is decreased.

In this way, the magnetic path forming member 12 is displacable toward the normal and reverse directions. If the magnetic path forming member 12 is displaced, the volume of the main fluid chamber 15 is varied so that the variation in the volume causes an expansion spring of the supporting resilient member 6 is deformed. Consequently, the active supporting force in the normal and reverse directions is developed on the active type engine mount 1.

Each filter coefficient Wi of the adaptive digital filter W as the drive signal y is sequentially updated in accordance with the equation (1) of the synchronous-type Filtered-X algorithm. Hence, after the convergence of each filter coefficient Wi of the adaptive digital filter W to the optimum value upon the passage of a time, the drive signal y is supplied to the active type engine mount 1. Consequently, the engine vibration during the engine idling and the enclosed vibration to be transmitted to the vehicle body 35 via the active type engine mount 1 from the engine 30 can be reduced.

Figure 4:
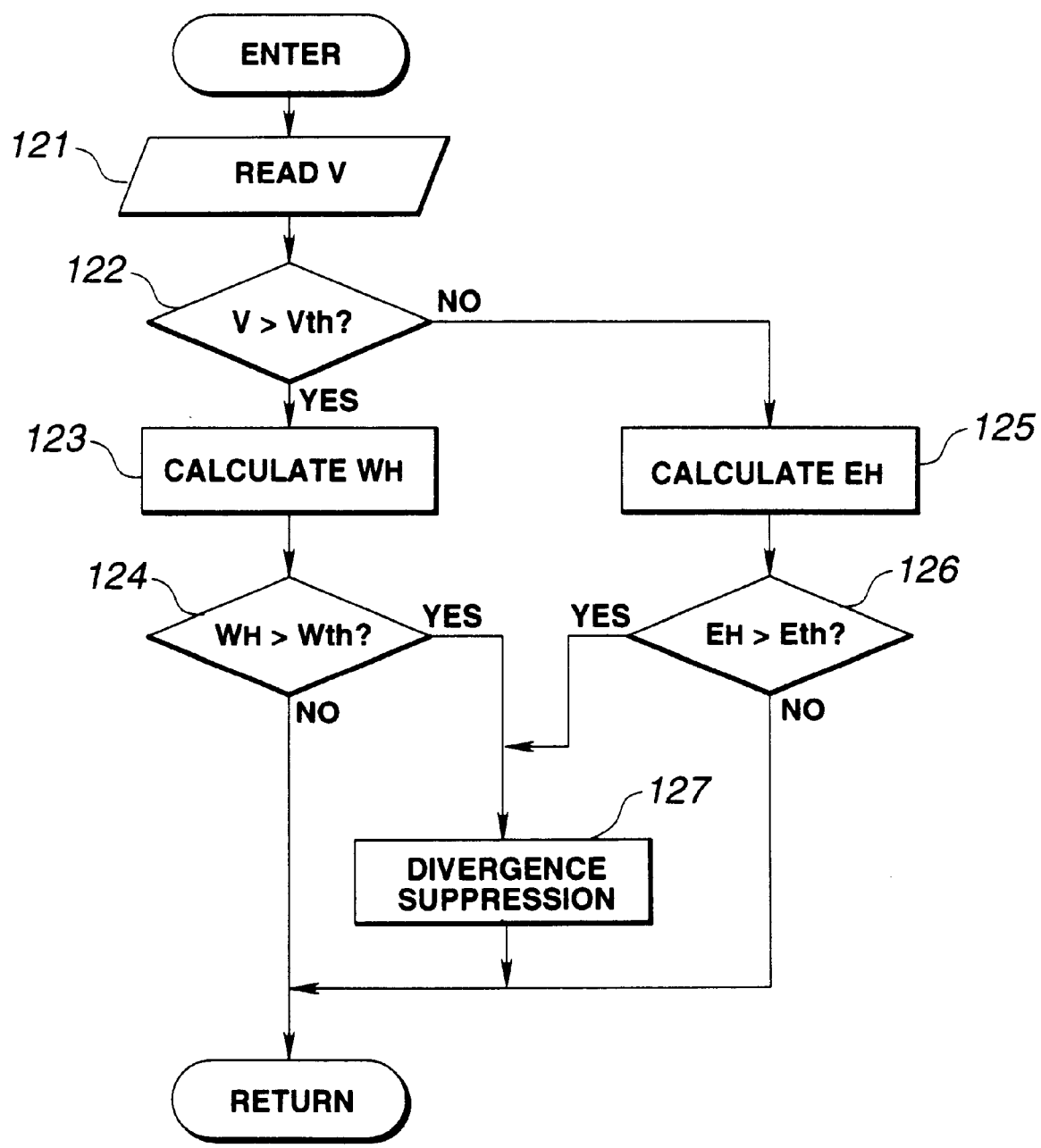
FIG. 4 is a processing flowchart executed in the controller for explaining a divergence determination processing routine in the first embodiment shown in FIGS. 1A to 3.

FIG. 4 shows another operational flowchart for explaining the divergence determination processing executed at the step 120 described above with reference to FIG. 3.

At a step 121, the CPU 25b reads the vehicle speed indicative signal V. At the next step 122, the CPU 25b determines whether the vehicle speed is exceeding an extremely low vehicle speed value Vth within which the vehicle speed is determined to be approximately stopped (for example, Vth=5 Km/h).

If the determination at the step 122 is "YES", that is to say, the vehicle is determined to be running, the routine goes to a step 123 in which a determination value of $V_H$ used for determining the higher-order divergence in accordance with the following equation (2) is calculated.

$$W_H = \sum_{K=0}^{N2} |W_k + W_{k+N2}| \quad (2)$$

In the equation (2), N2 denotes an integer of a halved value of the number of output times Ty corresponding to the present number of taps of the adaptive digital filter W whose numerical value below a decimal point has been under an omission of fractions and from which one is subtracted. In details, a first determination value $W_H$ is a total sum of an absolute value of two sampled values for one period of the drive signal y (corresponding to one circulation of the updating of the whole filter coefficients Wi).

The two sampled values are filter coefficient $W_k$ and filter coefficient $W_{k+N2}$ whose phases are shifted mutually by a half period (of the drive signal y) and which are derived from the respective filter coefficients Wi included within one period of a fundamental order component of the adaptive digital filter W.

It is noted that since, in the case where the number of the output times Ty is an odd number, the phases of the filter coefficients $W_k$ and $W_{k+N2}$ are deviated by the exact half period so that the two values whose phases are deviated by the half period are added together.

Figure 5:
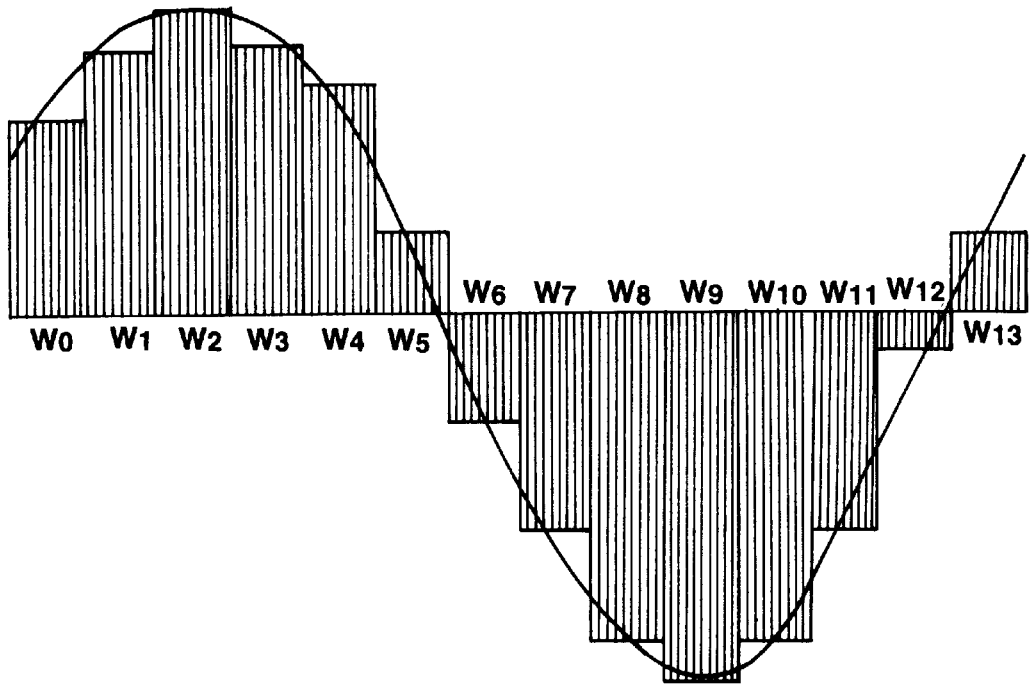
FIG. 5 is an waveform chart for explaining a waveform in an adaptive digital filter shown in FIG. 1C.

That is to say, since the vibration developed on the engine 30 is periodic, the respective filter coefficients Wi of the adaptive digital filter W draws a trajectory in a form of, e.g., a sinusoidal waveform as shown in FIG. 5.

FIG. 5 exemplifies a case of the first embodiment wherein the number of the output times Ty is 14 (Ty=14) and fourteen filter coefficients $W_0$ through $W_{13}$ constitute the adaptive digital filter W.

The above-described equation (2) is, in this case, calculated as:

$W_H=|W_0+W_7|+|W_1+W_8|+|W_2+W_9|+|W_3+W_{10}|+|W_4+W_{11}|+|W_5+W_{12}|+|W_6+W_{13}|$.

When the determination value $W_H$ is calculated at the step 123, the routine goes to a step 124 in which the CPU 25b determines whether $W_H$>Wth (Wth denotes a predetermined threshold value). If "NO" at the step 124, the CPU 25b determines that the high-order divergence is not determined to occur and the routine goes to the step 111 shown in FIG. 3.

On the other hand, if "NO" at the step 122, i.e., if the CPU 25b determines that the vehicle is stopped, the routine goes to a step 125 in which another determination value $E_H$ used to determine an occurrence of the higher-order divergence is calculated as follows:

$$E_H = \sum_{K=n-N2}^{n} |e(k) + e(k-N2)|. \quad (3)$$

In the equation (3), N2 denotes the above-described integer in the case of the equation (2) and n denotes a latest value of the superscript k.

The determination value $E_H$ is a total sum of the absolute value of two sampled values per one period of the residua vibration signal e.

The two sampled values are two residual vibration signals e(k) and e(k−N2) whose phases are deviated by the half period and which are sampled from the residual vibration signal e(n) included within one period of the fundamental order of the residual vibration signal e. It is noted that since, in the case where the number of output times Ty indicates the odd number, both phases of the residual vibration signal e(k) and the residual vibration signal e(k−N2) are not deviated mutually by the exact half period but deviated by the approximately half period.

Since the residual vibration signal e is the signal representing the residual vibration after the vibration developed on the engine 30 has been interfered with the control vibration developed on the active type engine mount 1, the residual vibration signal e draws the trajectory in the form of the sinusoidal waveform in the same way as the case of the respective filter coefficients Wi of the adaptive digital filter W as shown in FIG. 5.

However, since the vibration developed on the engine 30 is canceled to some degree, the amplitude of the fundamental order component of the residual vibration signal e becomes small as compared with that in the case where the vibration reduction control is not executed. If the number of output times Ty=14 and the superscript n at the present time point is zero, the above equation (3) can be expressed as:

$E_H=|e(-6)+e(-13)|+|e(-5)+e(-12)|+|e(-4)+e(-11)|+|e(-3)+e(-10)|+|e(-2)+e(-9)|+|e(-1)+e(-8)|+|e(0)+e(-7)|$.

Then, if the determination value $E_H$ is calculated, the routine goes to a step 126 in which the CPU 25b determines whether the determination value $E_H$ is larger than a corresponding predetermined threshold value Eth.

If "YES" at either the step 124 or step 126, the routine goes to the step 127. Upon completion of the divergence suppression processing at the step 127, the routine returns to the series of processing shown in FIG. 3. The divergence suppression processing executed at the step 127 will be described below.

That is to say, each filter coefficient Wi is reset to an initial value. Alternatively, the value of each filter coefficient Wi of the adaptive digital filter W is reduced by a predetermined ratio (for example, 50%). Alternatively, a low-pass filter may be used to filter the adaptive digital filter to eliminate high frequency components of the adaptive digital filter W.

In the first embodiment, the processing to determine the high-order divergence in parallel to the vibration reduction control processing is executed. If the high-order divergence is determined to occur while the divergence determination processing is executed, the divergence suppression processing is immediately executed. Consequently, a remarkably developed higher-order divergence of the control can be avoided. The consequent vibration due to the higher-order divergence of control can be avoided. The consequent vibration due to the high-order divergence such as to give an unplasant feeling to the vehicular occupant can be prevented from occurring.

In addition, a calculation processing required newly to determine the higher-order divergence is basically a simple addition processing as defined by the equations (2) and (3). Hence, a calculation load onto the CPU 25b is only slightly increased. Then, it is not necessary to mount a highly expensive microprocessor capable of processing programs at high speed even in a case where the parallel run of both vibration reduction processing and higher-order divergence determination processing is carried out as in the first embodiment.

That is to say, the determination value $W_H$ used to determine the occurrence of the higher-order divergence at the step 124 shown in FIG. 4 essentially comprises the sum of two filter coefficients $W_k$ and $W_{k+N/2}$ whose phases are mutually deviated by the half period, as appreciated from the equation (2). The two sampled values of the filter coefficients $W_k$ and $W_{k+N/2}$ whose phases are deviated by the half period include the fundamental order component and the odd-number order components. The fundamental order component and the odd-number order component have amplitudes mutually equal in positive and negative directions.

Hence, if these two sampled values are added together, the fundamental order and the odd-number order components (equal to or larger than third-order (3)) can be extinguished (fully canceled) or reduced. On the other hand, since the two sampled values of the filter coefficients also include even-number order components, the even-number order components having the amplitudes mutually equal to each other, the higher-order components include second or fourth order of the fundamental order component are resulted in a further emphasis. These relationships described above can be applied equally well to the residual vibration signal e. Consequently, it is possible to determine the occurrence of the higher-order divergence such as second order or fourth order divergence on the basis of these two sampled values on the drive signal y or residual vibration signal e.

Especially, in the first embodiment, the total sum of these two sampled values per one period of the sampled signal serves as the determination value $W_H$ or $E_H$. When the determination value $W_H$ or $E_H$ exceeds the corresponding predetermined threshold value Wth or Eth, the CPU 25b determines that the higher-order divergence has been detected (determined). Consequently, a highly accurate detection of the higher-order divergence can be made. That is to say, since all of the higher-order components in the fundamental order of the sampled signal are included within one period, either the determination value $W_H$ or $E_H$ without failure, possibilities of missing the higher-order divergence or of erroneously detecting the higher-order divergence can be reduced.

Figure 6:
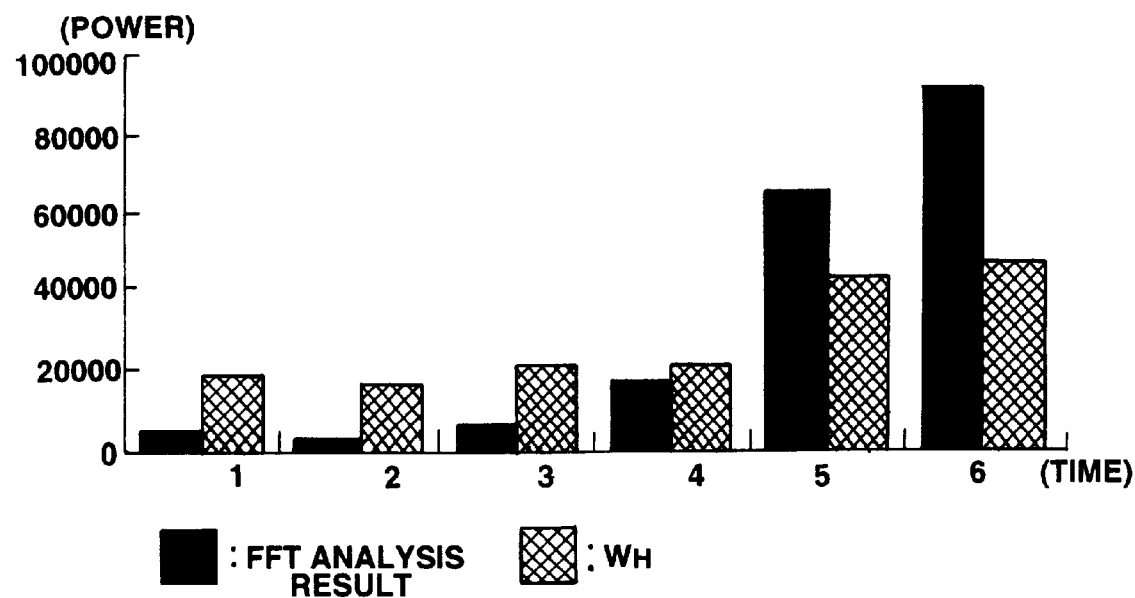
FIG. 6 is an explanatory view of bar graphs for explaining simulation results in the first embodiment and in a case of a FFT analysis.

FIG. 6 shows characteristic graphs indicating a result of simulations.

The determination value $W_H$ in the case where the fourth component in the fundamental order intentionally grown up and the fourth order divergence is developed is compared with a power of the fourth-order component obtained by processing the adaptive digital filter W through the FFT at the same time.

A lateral axis of FIG. 6 denotes a time passage and a longitudinal axis of FIG. 6 denotes the determination value $W_H$ and the power of the fourth-order component. Each right-side hatched bar graph at each time of 1, 2, 3, 4, 5, and 6 indicates the determination value $W_H$.

Each left-side black bad graph at each time of 1, 2, 3, 4, 5, and 6 indicates the FFT analyzed result of the fourth-order component power.

The determination value $W_H$ used to determine the higher-order divergence grows up in the same way as the fourth-order component power derived by obtaining the adaptive digital filter W. It is noted that the same result can be obtained when the same simulation is carried out for the second-order divergence.

That is to say, in the first embodiment, even when the determination value $W_H$ or $E_H$ is used which is derived in a simple manner without use of the FFT processing, the divergence of the second order or fourth-order with respect to the fundamental order can accurately be determined.

Furthermore, in the first embodiment, the CPU 25b determines the present vehicle speed on the basis of the vehicle speed indicative signal V. According to the result of the determination of the present vehicle speed at the step 122, the routine of FIG. 3 goes to either a step 123 or step 125 in which the corresponding determination value $W_H$ or $E_H$ is calculated. Hence, since either the threshold value Wth or Eth can be set to a suitable value, an efficient divergence determination processing is executed.

That is to say, in a case where the determination of the step 122 shown in FIG. 4 is "NO", i.e., in a case where the vehicle is approximately or completely stopped, components of the vibration inputted into the active type engine mount 1 from the road surface end to the active type engine mount 1 via the vehicle body 35 such as the suspension member are not included in the residual vibration signal e or included at the extremely low levels. If the vibration reduction control effectively functions, the vibration developed on the engine 30 is reduced by means of the active type engine mount 1.

Hence, since the residual vibration signal e includes the fundamental order component of the vibration developed on the engine 30 at a low level, the higher order component becomes relatively large. Under such a situation as described above, in order to reduce the idling vibration having the relatively high level, the level of the fundamental order component of the adaptive digital filter W becomes large and the higher-order component becomes reduced.

Hence, when the vehicle is substantially (approximately or completely) stopped, it is more efficient than the divergence determination using the adaptive digital filter W to detect the higher-order divergence on the basis of the residual vibration signal e.

However, if the determination of the step 122 is "YES", the CPU 25b determines that the vehicle is running. Since the noise components become dominated in the residual vibration signal e if used to determine the occurrence of the higher-order divergence, it becomes difficult to set the threshold value Eth. Consequently, the possibilities of missing the higher-order divergence or of erroneously detecting the higher order divergence become high as compared with those in the case of the vehicle stop. On the other hand, even during the vehicle run, the filter coefficient Wi is updated not only as the function of the residual vibration signal e but also as the function of the reference signal $R^T$ used to update the filter coefficients. Hence, the vibration components developed other than the engine 30 are difficult to give an influence on the updating of the adaptive digital filter W. In addition, since the idling vibration having the relatively high level does not tend to be developed, the level of the fundamental order component in the adaptive digital filter W is relatively small as compared with that when the vehicle is stopped.

Hence, it is more efficient than the determination of the higher order divergence using the residual vibration signal e to detect the higher-order divergence on the basis of the outputted filter coefficients Wi of the adaptive digital filter W during the vehicle run at the relatively high speed.

In the first embodiment, the weight sensor 22 is used to detect the vibration to be transmitted to the vehicle body 35 via the active type engine mount 1. Hence, the weight sensor 22 can supply the residual vibration signal e representing accurately magnitudes of the vibrations to the controller 25. In addition, the controller 25 can develop and output the drive signal y which reflects accurately magnitudes of the vibrations and the electromagnetic actuator 10 can displace the movable plate 12 at amplitudes in proportion to the magnitude of the vibration.

Hence, the weight sensor 22 can supply the residual vibration signal e representing accurately magnitudes of the vibrations to the controller 25. In addition, the controller 25 can develop and output the drive signal y which reflects accurately the magnitudes of the vibrations and the electromagnetic actuator 10 can displace the movable plate 12 at amplitudes in proportion to the vibration. Consequently, a preferable vibration reduction control over a whole control frequency band from the engine idling vibration range (20 Hz to 30 Hz) to the enclosed sound vibration (80 Hz to 800 Hz).

Furthermore, since the weight sensor 22 is incorporated within the active type engine mount 1 and a tightening force developed by the bolt 9 is not applied to the weight sensor 22, a weight withstanding condition on the weight sensor 22 becomes lowered. A small-sized weight sensor 22 can be adopted in the active type engine mount 1 which requires a small spatial margin and can be cost effective. Since the weight sensor 22 is integrally mounted on the active type engine mount 1, a number of assemblies of actually mounting the active type engine mount 1 on the vehicle can be reduced and, therefore, a working efficiency of a manufacturing of the vehicle can be improved.

(Second Embodiment)

Figure 7:
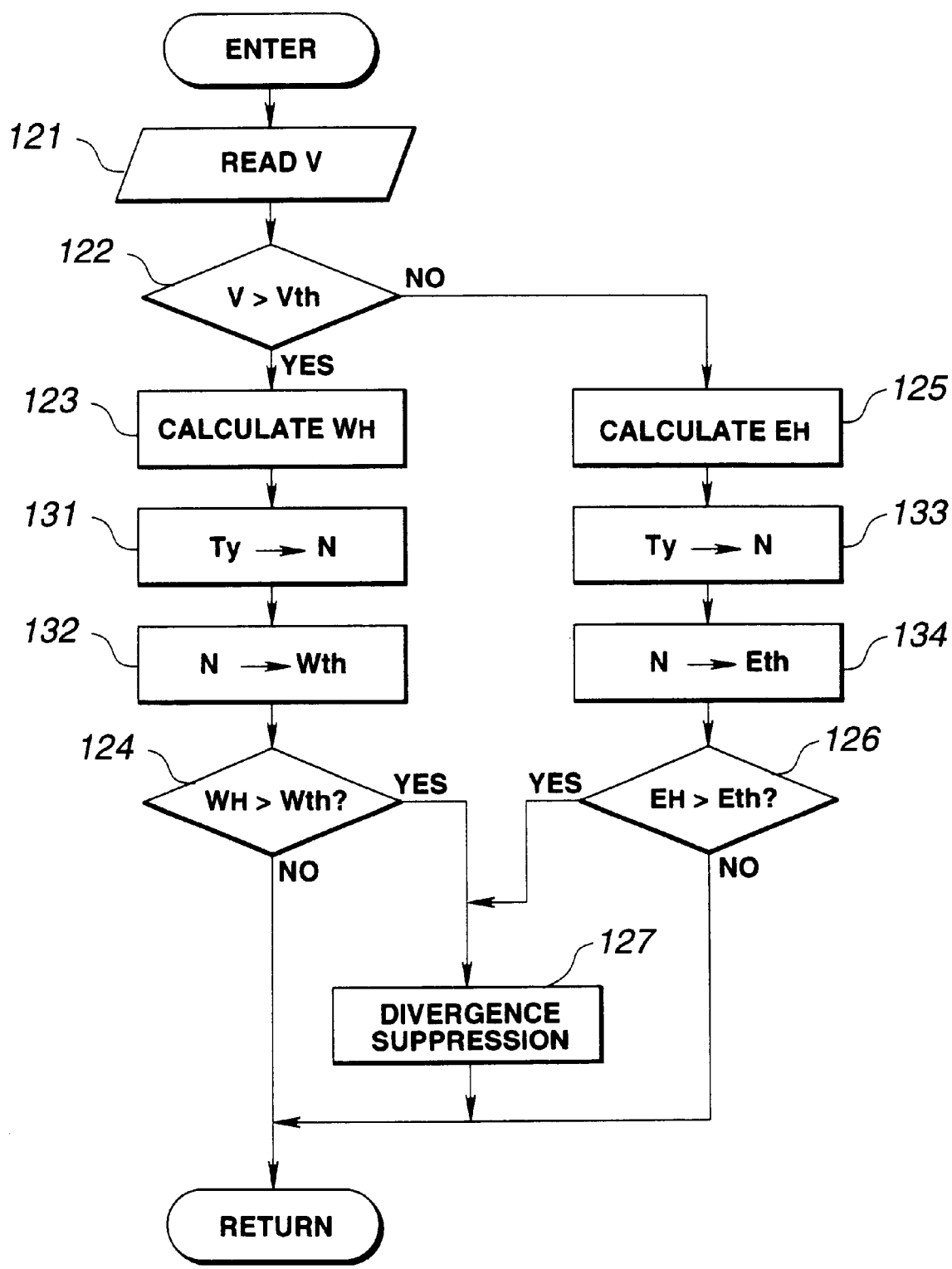
FIG. 7 is another processing flowchart executed in the controller in a second preferred embodiment for explaining the divergence determination processing routine executed in the second embodiment.
Figure 8:
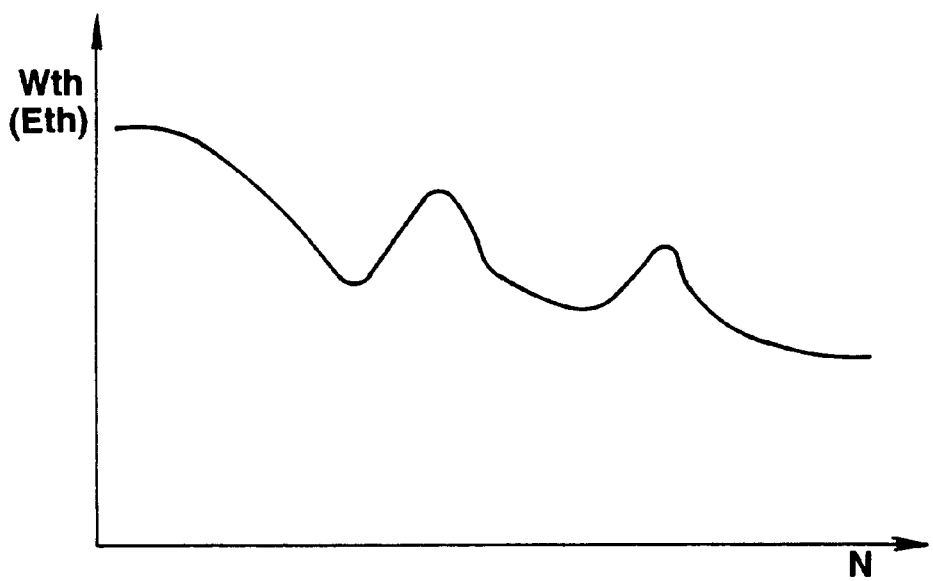
FIG. 8 is a characteristic graph representing a relationship between an engine revolution speed and a threshold value used in the divergence determination.

FIGS. 7 and 8 show a second preferred embodiment of the actively vibration and/or noise reducing apparatus according to the present invention.

Especially, FIG. 7 shows a flowchart representing the divergence determination processing routine executed in the controller 25 of the second embodiment.

(It is noted that the structure of the actively vibration and/or noise reducing apparatus in the case of the second embodiment is the same as that shown in FIGS. 1A to 3 in the case of the first embodiment). The detailed explanation thereof will be omitted herein.

That is to say, in the second embodiment, both of the threshold values Wth and Eth, the corresponding one of which is used at the step of either 124 or 126, are variable according to the engine revolution speed. Hence, a more accurate divergence determination processing is achieved. Specifically, if the (first) determination value $W_H$ is calculated at the step 123 of FIG. 7, the routine goes to a step 131 in which the present engine revolution speed N is calculated on the basis of the number of output times Ty and sampling clock Cp.

The number of output times Ty is the number of times the drive signal y is outputted from the controller 25 for one period of the reference signal x. The interval during the output of the drive signal y equals to the period of the sampling clock Cp.

Since one period of the reference signal x is synchronized with the half revolution of a crankshaft of the engine 30, the number of the engine revolutions N can be calculated on the basis of the number of the output times Ty and sampling clock Cp.

The routine, then, goes to a step 132 from the step 131. At the step 132, the CPU 25b refers to a memory table already structured as shown in FIG. 8 using the present engine revolution speed N to set the threshold value Wth.

The routine goes to the step 124 in which the same determination processing is executed as shown in FIG. 4.

In details, the vibration frequency developed on the engine 30 is determined without exception from the engine revolution speed N. According to the vibration frequency, a resonance of the vehicle body 35 is excited so that the level of the vibration at a mounted position of the weight sensor 22 is varied. If the level of the residual vibration signal e outputted by the weight sensor 22 is varied, the magnitudes of the respective filter coefficients Wi of the adaptive digital filter W updated using the residual vibration signal e are accordingly varied and the magnitudes of the higher-order (harmonic) components included in the adaptive digital filter W are also varied.

In the second embodiment, the threshold value $W_H$ used in the determination of whether the calculated determination value $W_H$ exceeds the threshold value Wth is already stored in the ROM 25d in the form of a memory table through the simulation. In the actual divergence determination processing, if the threshold value is set referring to the memory table in accordance with the engine revolution speed N, a suitable threshold value Wth is set so that the more accurate determination of the higher order divergence can be achieved.

When the routine of FIG. 7 goes to the step 125 from the step 123 and the determination value $E_H$ is calculated at the step 125, the routine goes to a step 133 in which the CPU 25b calculates the present engine revolution speed N on the basis of the number of output times Ty and sampling clock Cp.

Then, the routine goes to a step 134 in which the CPU 25b refers to another memory table equal to that shown in FIG. 8 using the calculated engine revolution speed N to set a threshold value Eth. Then, the routine goes to the step 126 in which the CPU 25b determines whether $E_H$>Eth.

Hence, in the case where the higher order divergence is carried out on the basis of the residual vibration signal e with the vehicle approximately or completely stopped, the more accurate determination of the higher order divergence can be achieved.

The vibration level developed on the engine 30 is varied according to an intake negative pressure of the engine 30.

Figure 9:
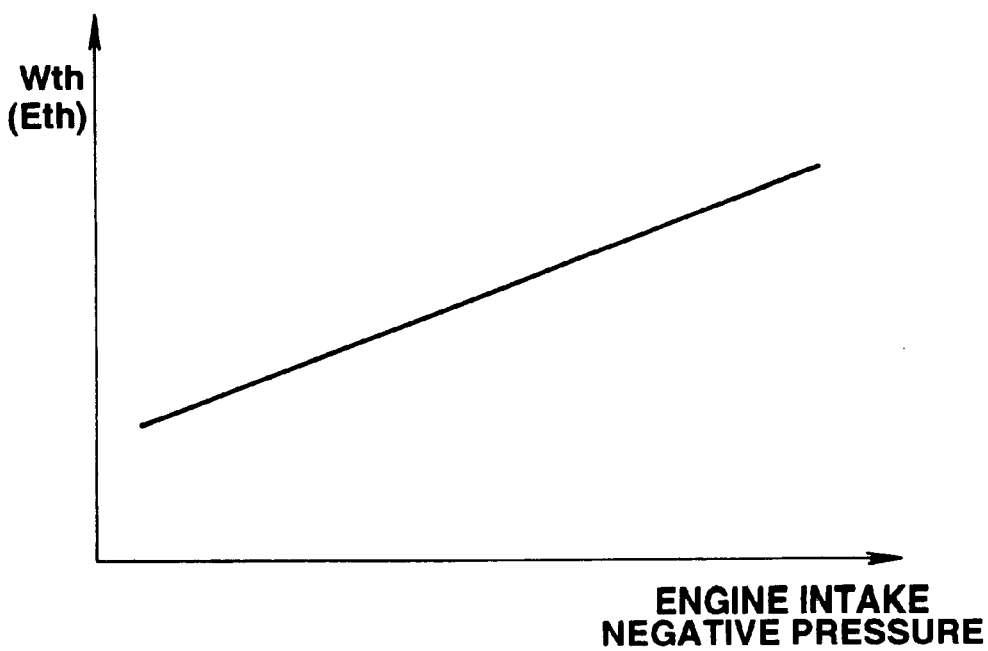
FIG. 9 is a characteristic graph representing a relationship between an engine intake negative pressure and a threshold value used in the divergence determination.

A switch 100A, connected to the input interface 25a of the controller 25, is, for example, installed within the engine 30 to detect the intake negative pressure. On the basis of the engine intake negative pressure detected by the sensor 100A, a memory table such as shown in FIG. 9, is referred to in order to set the threshold value Wth. Consequently, the more accurate determination of the higher order divergence can be made. If the threshold value Eth is varied according to the engine intake negative pressure, the more accurate determination of the higher order divergence can be made.

In the same way, the level of the vibration developed on the engine 30 is also varied according to a shift position of an automatic power transmission which is mounted in the vehicle. For example, if a gear range shift position sensor 100B is installed which detects any selection of neutral (N), parking (P), drive (D), or reverse (R) range, the CPU 25 determines the present gear range shift position according to an output signal of the gear range shift position sensor 100B. If either of the threshold values Wth or Eth is switched to another value depending upon the result of determination by the CPU 25b that the present shift position of the automatic power transmission is placed at any one of the shift positions, the more accurate determination of the higher order divergence can be achieved.

It is noted that, in a normal vehicle, the level of the vibration developed on the engine 30 is low when the shift position is placed at the neutral or parking range (N or P) and is high when the shift position is placed at the drive (D) or reverse (R) range.

The level of vibration developed on the engine 30 is, furthermore, varied according to an opening angle of an accelerator.

Figure 10:
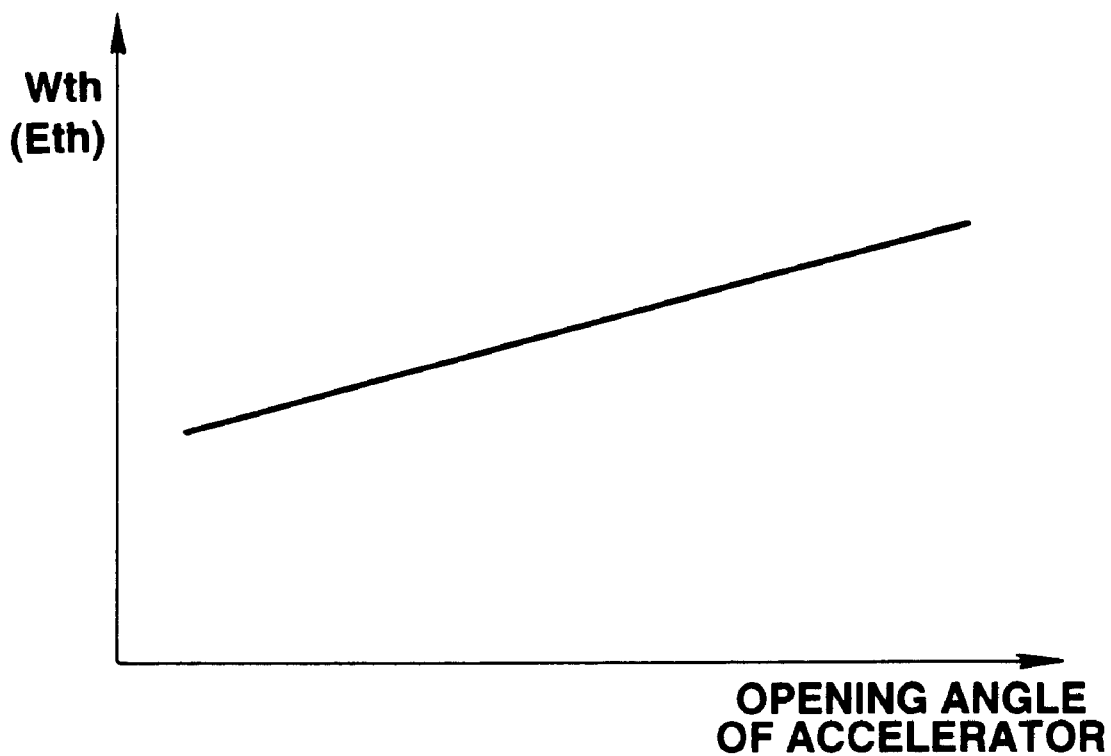
FIG. 10 is a characteristic graph representing a relationship between an opening angle of an accelerator and a threshold value used in the divergence determination.

A sensor 100C is installed which detects an opening angle of the accelerator. On the basis of a sensor output signal, the CPU 25b refers to a memory table prepared as shown in FIG. 10 to set the threshold value Wth. The more accurate detection of the higher order divergence can be made. The threshold value Eth is varied according to the opening angle of the accelerator detected by the sensor 100C.

In this way, if each of the threshold values Wth and Eth is a variable depending on at least one of factors, i.e., the engine revolution speed N, engine intake negative pressure, gear shift position, and opening angle of the accelerator, the more accurate determination of the higher order divergence can be made as compared with each of the fixed threshold values Wth or Eth. It is preferable, in terms of the more accurate determination of the higher order divergence, that each of the threshold values Wth or Eth is the variable depending on a plurality of the factors. For example, while a reference value for the threshold value Wth is set referring to a memory table as shown in FIG. 8, a correction coefficient of the threshold value Wth may be set referring to the memory table shown in FIGS. 9 and 10 on the basis of at least one of the three factors of the engine intake negative pressure, the shift position, and accelerator opening angle. Then, a final threshold value Wth may be derived by multiplying the correction coefficient by the reference value of the threshold value Wth. Alternatively, the memory table representing the relationship between the engine revolution speed N and the threshold value Wth as shown in FIG. 8 is set plurally, with the engine intake negative pressure, the shift position, and opening angle of the accelerator set as the variables. One memory table from the plurality of memory tables is selected on the basis of the engine intake negative pressure, shift position, and the opening angle of the accelerator. The threshold value Wth may be set referring to the selected memory table. The same case can be applied equally well to the other threshold value Eth.

(Alternatives)

In each of the first and second embodiments, the divergence detection processing is carried out on the basis of the filter coefficients Wi of the adaptive digital filter W. In a case where the synchronous-type Filtered-X LMS algorithm is used as the adaptive algorithm, both of the drive signal y and each of the filter coefficients Wi are equal to each other. Hence, in a case where a normal LMS algorithm or another adaptive algorithm is used, the drive signal y may be used in place of each of the filter coefficients Wi and the threshold value Wi may be calculated according to the above equation (2). Consequently, the higher order divergence of the control can be determined.

In each of the first and second embodiments, the vehicle speed is detected. Then, according to the magnitude of the vehicle speed, either of the steps 123 and 124 or steps 125 or 126 is executed. However, although an efficiency is reduced, irrespective of the value of the vehicle speed detection signal V, either of the steps 123 and 124 or the steps 125 and 126 may always be executed. In this alternative case, a large inconvenience does not occur.

In each of the first and second embodiments, the determination value of $W_H$ or $E_H$ is the total sum per one period of the absolute value of the two suitably sampled values. However, it is always not necessary to make a total sum per one period. In other words, although the accuracy is more or less deteriorated as compared with each of the first and second embodiments, the absolute value of the sum of the properly sampled two values is directly set to the determination value $W_H$ or $E_H$.

Alternatively, the presence or absence of the higher order divergence may be determined as the determination value $W_H$ according to two or three absolute value added results.

Alternatively, each absolute value of the sum of the two properly sampled values may be added over two or more periods and the added value may be set to the determination value $W_H$ or $E_H$. Then, the presence or absence of the divergence may be determined according to the added value as the determination value $W_H$ or $E_H$.

In each of the first and second embodiments, the weight sensor 22 incorporated into the active type engine mount 1 detects the residual vibration. However, for example, an acceleration sensor (also called, accelerometer) used to detect the vibration on a floor from a position of the floor corresponding a foot end of the vehicular occupant within the passenger compartment may be disposed and an output signal of the acceleration sensor may serve as the residual vibration signal e.

In addition, in the second embodiment, the engine revolution speed N is derived according to the calculation based on the number of the output times Ty. However, an output signal of an engine revolution speed sensor (also called a crank angle sensor) which detects the revolution of the engine crankshaft may be read by the controller 25. Since the engine revolution speed N exactly corresponds to the number of output times Ty, the relationship between the number of output times Ty and the threshold value Wth may be stored in the form of a memory table. In this alternative case, it is possible to set the threshold value Wth without conversion of the number of output times Ty into the engine revolution speed N. Consequently, it is more advantageous since an arithmetic calculation load on the CPU 25b can accordingly be reduced.

Each of the first and second embodiments describes the active vibration reducing apparatus for a vehicle which reduces the vibration transmitted from the engine 30 to the vehicle body 35.

However, the present invention is applicable to an active noise reducing apparatus for actively reducing the periodic noise to be transmitted from the engine 30 as a noise source into the passenger compartment.

In the case of the active noise reducing apparatus to which the present invention is applicable, a loud speaker as a control sound source to generate a control sound within the passenger compartment and a microphone as a residual noise detector to detect a residual noise within the passenger compartment may be installed within the vehicle.

Then, the loud speaker may be driven in response to the drive signal y achieved by the same arithmetic processing as in the case of each of the first and second embodiments and, simultaneously, an output signal from the microphone may be used in the updating processing of each filter coefficient Wi of the adaptive digital filter as a residual noise signal e. If the residual noise signal e is used in the divergence determination processing in the same way as in each of the first and second embodiments, the same advantages as those achieved in each of the first and second embodiments can be achieved.

It is noted that an arrangement of the loud speaker, the controller, and the microphone in the actively noise reducing apparatus is exemplified by a U.S. Pat. No. 5,337,365 issued on Aug. 9, 1994 (, the disclosure of which is herein incorporated by reference).

The present invention is applicable to an active vibration reducing apparatus or an active noise reducing apparatus for reducing the periodic vibration or the periodic noise developed on another vibration source except the engine 30.

The present invention is also applicable to an active vibration and/or noise reducing apparatus for actively reducing the periodic vibration and/or noise developed from, for example, a machine tool and transmitted to a floor on which the machine tool is mounted or to a room.

It is also noted that although, in each of the first and second embodiments, the synchronous-type Filtered-X LMS algorithm is used as the adaptive algorithm, another type of Filtered-X LMS algorithm may be applied as the adaptive algorithm.

(Advantages)

Since, according to the present invention defined in the claim 29, predetermined two values are sampled from the output signal of the adaptive digital filter or the residual signal representing the residual state of the noise or vibration and the higher order divergence of the control is determined on the basis of the sum of the two sampled values, the presence or absence and the magnitude of the higher order divergence can easily be determined.

In other words, since an object to be controlled is the periodic vibration or noise, the fundamental order component of the periodic vibration or noise draws the sinusoidal curve. Hence, if the phase difference between the two sampled values is appropriately selected, the fundamental order components included in the corresponding signal are canceled when the two sampled values are added together. On the contrary, even if the two sampled values are added, the frequency components twice (second order) and four times (fourth order) the fundamental frequency are not canceled but rather amplified so as to be left in the added result. Hence, to what degree the frequency components in the second order and fourth order of the fundamental frequency component of the drive signal (y) or the residual wave signal (e) are included can easily be determined. Consequently, the higher order divergence, such as those in the second order and fourth order, can be determined on the basis of the two sampled values as defined in the claim 29.

According to the present invention defined in the claim 1, the reference signal generator generates and outputs the reference signal representing the developed condition of the periodic wave (the wave is vibration or noise), the adaptive digital filter filters the reference signal to generate and output the drive signal, and the drive signal is supplied to the control wave generating source (the control acoustic wave generating source or the control vibration generating source), the control wave (the control acoustic wave (sound) or the control vibration) being interfered against the periodic wave (periodic vibration or noise). Then, the residual wave detector detects the residual wave after the interference and outputs the residual wave (residual vibration or residual noise) signal.

The adaptive algorithm is operated in accordance with which the filter coefficients of the adaptive digital filter are updated on the basis of the reference signal and residual wave signal. These series of functions indicate a basic operation of the adaptive control of reduction of the vibration or noise.

Furthermore, the divergence determinator determines the divergence of the control on the basis of the two sampled values of either the drive signal or the residual wave signal whose phases are mutually deviated from each other by the approximately half period of the corresponding drive signal or residual wave signal.

Since the fundamental frequency components (the periodic vibration or noise) included in the two values whose phases are deviated by the approximately half period of the drive signal which is the output signal of the adaptive digital filter should, theoretically, have the same magnitudes and the different polarities, the fundamental order components of the added value of these two sampled values are canceled.

On the contrary, even if the two values are added, the second order and fourth order harmonic components of the fundamental order components are not canceled. Hence, since the easy determination to what degree the second order and fourth order components are included in the drive signal can be made, the divergence of the control can be determined.

The same advantages are applied to the claims 2 and 3.

According to the present invention defined in the claim 3, the divergence determinator determines the divergence of the control on the basis of the sum of the two sampled values of the residual wave signal whose phases are mutually deviated from each other by approximately half period of the fundamental order of the residual wave signal. The fundamental order components included in the two sampled values of the residual wave signal whose phases are mutually deviated by approximately half period should have the same magnitudes and different polarities so that, when these two values are added, the fundamental order components are canceled.

On the contrary, even if the two values are added, the second order and fourth order harmonic components of the fundamental order components are not canceled. Hence, since the easy determination to what degree the second order and fourth order components are included in the drive signal can be made, the divergence of the control can be determined.

According to the present invention defined in the claim 6, the periodic wave generating source is restricted to the engine mounted in the vehicle.

According to the present invention defined in the claim 6, the controller comprises the vehicle speed determinator determines whether the vehicle speed is in excess of the predetermined extreme low speed value. In details, the vehicle speed determinator determines whether the vehicle is approximately or completely stopped (the vehicle is running at the extremely low speed or is stopped) or is running. According to the result of determination of the vehicle running speed by the vehicle speed determinator, the first divergence determinator or the second divergence determinator is effected.

That is to say, since, under such a situation that the vehicle is substantially (approximately or completely) stopped. a kind of vibration or noise (for example, a so-called road surface noise developed between each road wheel of the vehicle and a wind noise developed on each wind shield and rear view mirror of the vehicle during the run of the vehicle) is not generated or is generated at an extremely low level. At this time, the result of the interference between the periodic wave (periodic vibration or noise) developed on the engine and the control wave (the control acoustic wave or the control vibration) is dominated in the residual vibration or noise (wave) signal.

If the reduction control is effective under this situation, the fundamental order components included in the residual wave (vibration or noise) signal become small but the higher order components become relatively large. However, under the situation such that the vehicle is substantially stopped since the levels of the fundamental order components of the adaptive digital filter are enlarged in order to reduce the engine idling vibration or engine idling noise, each having the relatively high level, the higher order components are masked by the fundamental order components and the higher order divergence is difficult to be determined until the higher order components thereof become large to some degree.

On the contrary, since, during the run of the vehicle, the vibration or noise developed on another vibration (generating) source or noise (generating) source than the engine is detected by means of the residual wave (vibration or noise) detector and is included in the residual wave (vibration or noise) signal, noise components for the determination of the higher order divergence are so large that the possibility of missing the higher order divergence and the possibility of erroneously determining the higher order divergence become large as compared with the case of the vehicle stopped situation. However, even, during the vehicular run, it is difficult for the vibration or noise components developed from the vibration (generating) source or noise (generating) source except the engine to be inputted to the adaptive digital filter. In addition, during the run of the vehicle, the engine idling vibration or engine idling noise is not developed, the levels of the fundamental order components of the adaptive digital filter are relatively small so that it is relatively easy for the higher order components to be determined (discriminated) during the run of the vehicle Hence, according to the present invention defined in the claim 6, the first divergence determinator is effected to determine the higher order divergence on the basis of the drive signal when the vehicle is running at speed higher than the predetermined extremely low speed and the second determinator is effected to determine the higher order divergence on the basis of the residual wave (vibration or noise) signal when the vehicle is substantially stopped. Consequently, a highly efficient (earlier) determination of the higher order divergence can be achieved According to the present invention defined in the claim 7, the calculator calculates the total of the absolute values of the sum of the two sampled values over the period of the periodic vibration or noise and the divergence determinator determines the divergence on the basis of the total thereof. Consequently, the possiblity of missing the higher order divergence becomes extremely reduced.

In other words, since, an information on the higher order components with respect to the fundamental order components is wholly included within the one period of the fundamental order period, the higher divergence can be determined with a high possibility if it is based on the information over the whole one period thereof.

Furthermore, according to the present invention defined in each of the claims 7 to 23, the threshold value (Wth or Eth) used to determine the higher order divergence is a variable based on a factor by which the level of the developed vibration or noise can be estimated. Consequently, the more accurate determination of the higher order divergence can be made.

That is to say, if the apparatus for actively reducing the vibration and/or noise according to the present invention is applied to the vehicle and the engine serves as the vibration or noise generating source, the frequency of the vibration or noise developed on the engine is determined without exception from the engine revolution speed. If the frequency of the developed vibration or noise is different, the level of the vibration or noise at a position of the interference is also varied due to an influence given by the resonance characteristic of the vehicle body.

In addition, since the magnitude of each filter coefficient of the adaptive digital filter and the level of the residual wave (residual vibration or noise) signal representing the residual state of the periodic vibration or noise (wave), the higher possibility of missing or erroneously detecting the higher order divergence cannot be avoided if the threshold values (Wth and Eth) are fixed.

According to the present invention defined in each of the claims 16 and 17, the threshold value is varied according to the engine revolution speed (N). Consequently, the more accurate determination of the higher order divergence can be achieved.

If the vehicular engine serves as the vibration or noise generating source, the level of the vibration or noise at the interference position is largely varied according to the engine intake negative pressure.

According to the present invention defined in each of the claims 20 and 21, the threshold value is varied according to the engine intake negative pressure.

Consequently, the more accurate determination of the higher order divergence can be made.

If the vehicular engine serves as the vibration or noise generating source, the level of the vibration or noise at the interference position is varied according to the gear shift position of the (automatic) power transmission mounted in the vehicle. For example, when the shift position of the automatic power transmission is placed at either of the neutral position or the drive position, the resonance system on the engine developed vibration or noise is different and a transmission route of the vibration or noise is different so that the level of the vibration or noise at the interference position becomes varied. Hence, according to the present invention defined in each of the claims 18 and 19, the threhsold value is varied according to the shift gear position of the power transmission. Consequently, the more accurate determination of the higher order divergence can be achieved.

Furthermore, if the vehicular engine serves as the vibration or noise generating source, the level of the vibration or noise at the interference position is varied according to the opening angle of the engine accelerator (the opening angle of an engine throttle valve may be applied). This is because as the opening angle of the engine accelerator becomes larger, the level of the vibration or noise developed on the engine tends to become larger. Hence, according to the present invention defined in each of the claims 22 and 23, the threshold value is varied according to the opening angle of the accelerator.

What is claimed is:

1. An apparatus comprising:

g) a periodic wave generating source;

h) a control wave generating source so arranged and constructed as to be enabled to generate and output a control wave to be interfered against a periodic wave developed on the periodic wave generating source;

i) a reference signal generator so arranged and constructed as to generate and output a reference signal representing a developed condition of the periodic wave from the periodic wave generating source;

j) a residual wave detector so arranged and constructed as to detect a residual wave after the interference of the control wave outputted by the control wave generating source against the periodic wave developed on the periodic wave generating source and output a residual wave signal representing the residual wave; and k) a controller having; an adaptive digital filter so arranged and constructed as to filter the reference signal therethrough to generate and output a drive signal to drive the control wave generating source to generate and output the control wave; an adaptive algorithm in accordance with which filter coefficients of the adaptive digital filter are updated on the basis of either the reference signal or the residual wave signal so as to control a reduction of the periodic wave; a sampler so arranged and constructed as to sample at least one of either or both of the drive signal and the residual wave signal for a predetermined sampling period; a summer so arranged and constructed as to sum two sampled values of at least one of either or both of the drive signal outputted by the adaptive digital filter and the residual wave signal outputted by the residual wave detector; and a divergence determinator so arranged and constructed as to determine whether a higher order divergence of a control over a transmission of the periodic wave from the periodic wave generating source toward an external therefrom occurs on the basis of the sum of the two sampled values of either or both of the drive signal or the residual wave signal, phases of the two sampled values being mutually deviated from each other by an approximately half period of a fundamental order of the corresponding drive signal or residual wave signal.

2. An apparatus as claimed in claim 1, wherein the divergence determinator determines whether the higher order divergence of the control occurs on the basis of the sum of the two sampled values of the drive signal whose phases are mutually deviated from each other by approximately the half period of the fundamental order of the drive signal.

3. An apparatus as claimed in claim 1, wherein the divergence determinator determines whether the higher order divergence of the control occurs on the basis of the sum of the two sampled values of the residual wave signal whose phases are mutually deviated from each other by approximately the half period of the fundamental order of the residual wave signal.

4. An apparatus as claimed in claim 1, wherein the divergence determinator comprises a first divergence determinator arranged for determining whether the higher order divergence of the control occurs on the basis of the sum of the two sampled values of the drive signal whose phases are mutually deviated from each other by approximately the half period of the fundamental order of the drive signal and a second divergence determinator arranged for determining whether the higher order divergence of the control occurs on the basis of the sum of the two sampled values of the residual wave signal whose phases are mutually deviated from each other by approximately the half period of the fundamental order of the residual wave signal.

5. An apparatus as claimed in claim 4, wherein the periodic wave developed on the periodic wave generating source is either a periodic wave related to a vibration or a periodic acoustic wave related to a noise having a correlation to the vibration, the residual wave signal is a residual vibration signal or a residual noise signal, and the reference signal represents the developed condition of the vibration related periodic wave or the noise related acoustic wave.

6. An apparatus as claimed in claim 5, wherein the periodic wave generating source is an engine mounted on a vehicle, which further comprises a vehicle speed detector arranged for detecting a vehicle speed of the vehicle, wherein the controller comprises a vehicle speed determinator arranged for determining whether the vehicle speed is in excess of a predetermined extremely low speed value, and wherein the first divergence determinator is effected when the vehicle speed determinator determines that the vehicle speed is in excess of the predetermined extremely low speed value and the second divergence determinator is effected when the vehicle speed determinator is within the predetermined extremely low speed value.

7. An apparatus as claimed in claim 6, wherein the controller further comprises: a setter arranged for setting a threshold value used to determine the occurrence of the divergence; and a calculator arranged for calculating a total of absolute values of the sum of the two sampled values over a period of the fundamental order of the corresponding drive signal (y) or the corresponding residual vibration or noise signal (e) as a determination value ($W_H$ or $E_H$) and wherein the divergence determinator determines whether the higher order divergence of the control occurs according to whether a calculated result of the calculator is in excess of the threshold value.

8. An apparatus as claimed in claim 7, wherein the setter comprises a first setter arranged for setting a first threshold value (Wth) used in the determination of the divergence of the first divergence determinator and a second setter arranged for setting a second threshold value (Eth) used in the determination of the divergence of the second divergence determinator and wherein said first divergence determinator determines whether the higher order divergence of the control occurs according to whether the calculated result of the calculator on the drive signal is in excess of the first threshold value and said second divergence determinator determines whether the higher order divergence of the control occurs according to whether the calculated result of the calculator on the residual vibration signal as the determination value ($W_H$ or $E_H$) is in excess of the second threshold value.

9. An apparatus as claimed in claim 8, wherein the first divergence determinator determines that the higher order divergence of the control occurs when the calculated result of the calculator on the drive signal as the determination value ($W_H$) is in excess of the first threshold value (Wth).

10. An apparatus as claimed in claim 9, wherein the second divergence determinator determines that the higher order divergence of the control occurs when the calculated result of the calculator on the residual vibrtion signal ($E_H$) is in excess of the second threshold value (Eth).

11. An apparatus as claimed in claim 10, wherein the control wave generating source comprises an electromagnetic actuator, installed within an active type engine mount which supports the engine on a vehicle body and being responsive to the drive signal for developing a predetermined magnetomotive force, and the residual wave detector comprises a weight sensor, installed within the active type engine mount and being responsive to a vibration exciting force transmitted from the engine via a supporting resilient member of the active type engine mount for generating and outputting the residual vibration signal (e).

12. An apparatus as claimed in claim 11, wherein the calculator calculates the determination value ($W_H$) used in the first divergence determinator as follows:

$$W_H = \sum_{K=0}^{N2} |W_k + W_{k+N2}|,$$

wherein $W_k$ denotes the filter coefficient at the predetermined sampling period of k (k=0 to N2), N2 denotes an integer from which one is subtracted, the integer being a halved value of a number of times the drive signal is outputted (Ty) corresponding to a number of taps of the adaptive digital filter whose numerical values below a decimal point are under an omission of fractions.

13. An apparatus as claimed in claim 11, wherein the calculator calculates the determination value ($E_H$) used in the second divergence determinator as follows:

$$E_H = \sum_{K=n-N2}^{n} |e(k)+e(k-N2)|.$$

14. An apparatus as claimed in claim 13, wherein a number of the filter coefficients (Wi) of the adaptive filter (W) is fourteen and wherein the determination value ($W_H$) calculated by the calculator and used in the first divergence determinator is expressed as:

$W_H=|W_0+W_7|+|W_1+W_8|+|W_2+W_9|+|W_3+W_{10}|+|W_4+W_{11}|+|W_5+W_{12}|+|W_6+W_{13}|.$

15. An apparatus as claimed in claim 14, wherein the determination value ($E_H$) calculated by the calculator and used in the second divergence determinator is expressed as:

$E_H=|e(-6)+e(-13)|+|e(-5)+e(-12)|+|e(-4)+e(-11)|+|e(-3)+e(-10)|+|e(-2)+e(-9)|+|e(-1)+e(-8)|+|e(0)+e(-7)|.$

16. An apparatus as claimed in claim 7, wherein the controller calculates an engine revolution speed (N) on the basis of a number of times (Ty) the drive signal is outputted and the predetermined sampling period and wherein the threshold value (Wth or Eth) is varied according to the engine revolution speed (N).

17. An apparatus as claimed in claim 7, wherein the pulse signal generator comprises a crank angle sensor, wherein the controller comprises another calculator arranged for calculating an engine revolution speed (N) on the basis of an output signal of the crank angle sensor and wherein the threshold value (Wth or Eth) is varied according to the engine revolution speed (N).

18. An apparatus as claimed in claim 7, which further comprises a gear shift position sensor arranged for detecting a gear shift position of an automatic power transmission mounted on the vehicle and wherein the threshold value (Wth or Eth) is varied according to the gear shift position of the automatic power transmission.

19. An apparatus as claimed in claim 16, which further comprises a gear shift position sensor arranged for detecting a gear shift position of an automatic power transmission mounted on the vehicle and wherein the threshold value (Wth or Eth) is varied according to the gear shift position of the automatic power transmission.

20. An apparatus as claimed in claim 7, which further comprises an engine intake negative pressure sensor arranged for detecting an engine intake negative pressure and wherein the threshold value (Wth or Eth) is varied according to the detected engine intake negative pressure.

21. An apparatus as claimed in claim 19, which further comprises an engine intake negative pressure sensor arranged for detecting an engine intake negative pressure and wherein the threshold value (Wth or Eth) is varied according to the detected engine intake negative pressure.

22. An apparatus as claimed in claim 7, which further comprises an accelerator opening angle sensor arranged for detecting an opening angle of an engine accelerator and wherein the threshold value (Wth or Eth) is varied according to the opening angle of the engine accelerator.

23. An apparatus as claimed in claim 21, which further comprises an accelerator opening angle sensor arranged for detecting an opening angle of an engine accelerator and wherein the threshold value (Wth or Eth) is varied according to the opening angle of the engine accelerator.

24. An apparatus as claimed in claim 6, wherein the predetermined extremely low speed value is approximately 5 km/h.

25. An apparatus as claimed in claim 11, wherein the adaptive algorithm of the controller comprises a synchronous-type Filtered-X LMS algorithm.

26. An apparatus as claimed in claim 25, wherein the filter coefficients (Wi, i=0, 1, 2, - - - , I-1, wherein I denotes the number of taps in the adaptive digital filter) of the adaptive digital filter are updated as follows:

$Wi(n+1)=Wi(n)-\mu R^T e(n),$ wherein terms attached with (n) and (n+1) are values sampled at the predetermined sampling periods (n) and (n+1), respectively, $\mu$ denotes a convergence coefficient, $R^T$ denotes a reference signal used to update the filter coefficients and denotes a value as a result of filtering the reference signal (x) generated and outputted by the reference signal generator through a transfer function filter ($C^\wedge$) which is a model of a transfer function (C) between the electromagnetic actuator and the weight sensor.

27. An apparatus as claimed in claim 1, wherein the responsive to a determination of the divergence determinator that the higher order divergence occurs for resetting the filter coefficients of the adaptive digital filter to initial values so as to suppress the higher order divergence of the control.

28. An apparatus as claimed in claim 27, wherein the sampler comprises a sampling clock generator which generates and outputs a sampling clock (Cp) whenever the predetermined sampling period is passed.

29. A method for actively reducing a periodic vibration and/or noise developed on a periodic vibration and/or noise generating source and transmitted from the periodic vibration and/or noise generating source to an external therefrom, comprising the steps of:
   a) providing an adaptive digital filter;
   b) providing an adaptive algorithm;
   c) updating sequentially filter coefficients of the adaptive digital filter so as to execute a reduction control for the periodic vibration or noise;
   d) developing a residual wave signal representing a residual vibration or noise state of the external;
   e) sampling two values at a predetermined sampling period which would cancel a fundamental order component of either an output signal of the adaptive digital filter or the residual wave signal if the two values were added together;
   f) summing the two sampled values; and
   g) determining whether a divergence of the reduction control occurs on the basis of the summed sampled values.

30. A method for actively reducing a periodic reducing a periodic wave developed on a periodic wave generating source and transmitted from the periodic wave generating source to an external therefrom, comprising the steps of:
   a) developing a control wave to be interfered against a periodic wave developed on the periodic wave generating source;
   b) developing a reference signal representing a developed condition of the periodic wave from the periodic wave generating source;

c) detecting a residual wave after the interference of the control wave developed at the step a) against the periodic wave developed on the periodic wave generating source;

d) outputting a residual wave signal representing the residual wave;

e) filtering the reference signal developed at the step b) through an adaptive digital filter to generate and output a drive signal so that the control wave is developed at the step a);

f) providing an adaptive algorithm in accordance with which filter coefficients of the adaptive digital filter are updated on the basis of the reference signal and the residual signal for a predetermined sampling period;

g) sampling at least one of either or both of the drive signal and the residual signal for a predetermined sampling period;

h) summing two sampled values of at least one of either or both of the drive signal outputted by the adaptive digital filter and the residual wave signal outputted at the step d); and i) determining whether a higher divergence of a control over a transmission of the periodic wave from the periodic wave generating source toward an external therefrom occurs on the basis of the sum of the two sampled values of either or both of the drive signal and the residual wave signal, phases of the two sampled values being mutually deviated from each other by an approximately half period of a fundamental order component of the corresponding drive signal or residual wave signal.

* * * * *